United States Patent
Billger et al.

(10) Patent No.: US 7,347,299 B2
(45) Date of Patent: *Mar. 25, 2008

(54) ROTATING AND/OR SWIVELING SEAT

(75) Inventors: Steven C. Billger, Celina, OH (US); Michael P. Gallagher, Greenville, OH (US); Kevin A. Gilliland, Coldwater, OH (US); Eric J. Kaiser, Ft. Recovery, OH (US); Leroy M. Kluver, Celina, OH (US); Jay L. Kuck, St. Marys, OH (US); Steven R. Pulskamp, New Bremen, OH (US); Craig J. Rekow, Troy, OH (US); Adam M. Ruppert, Wapakoneta, OH (US); Gary L. Topp, New Bremen, OH (US); George R. Wetterer, Troy, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/539,676

(22) Filed: Oct. 9, 2006

(65) Prior Publication Data

US 2007/0074923 A1 Apr. 5, 2007

Related U.S. Application Data

(62) Division of application No. 10/948,500, filed on Sep. 23, 2004, now Pat. No. 7,121,608.

(51) Int. Cl.
*B60K 26/02* (2006.01)

(52) U.S. Cl. .................... 180/326; 180/329; 180/330; 180/331; 187/222

(58) Field of Classification Search ................ 180/326, 180/329, 330, 331, 272, 273; 187/222
See application file for complete search history.

(56) References Cited

U.S. PATENT DOCUMENTS 629,036 A 7/1899 Koenigkramer (Continued)

FOREIGN PATENT DOCUMENTS

DE 25 44 812 A1 4/1977

(Continued)

OTHER PUBLICATIONS

Crown Turret Stockpicker, Series TSP SF 4310, Rev. Mar. 2002.

(Continued)

*Primary Examiner*—Ruth Ilan
(74) *Attorney, Agent, or Firm*—Stevens & Showalter LLP

(57) ABSTRACT

An operator's compartment for an industrial vehicle comprises a platform floor, an operator's seat, at least one presence sensing device and a control module. The operator's seat has a base structure coupled to the platform floor and an operator support coupled to the base structure such that the operator support may be rotated with respect to the platform floor. Each provided presence sensing device is arranged to sense an operator's presence in a predetermined location in or about the operator's compartment and the control module is configured to control at least one operation of the vehicle based upon a rotational position of the operator's seat and a signal from at least one of the presence sensing device(s).

18 Claims, 12 Drawing Sheets

U.S. PATENT DOCUMENTS

| | | |
|---|---|---|
| 1,242,110 A | 10/1917 | Koken |
| 1,250,155 A | 12/1917 | Emond |
| 1,275,624 A | 8/1918 | Sopwith |
| 1,361,987 A | 12/1920 | Hamilton |
| 1,808,659 A | 6/1931 | Hultgren |
| 1,932,241 A | 10/1933 | Theophilus |
| 2,603,303 A | 7/1952 | Atlung |
| 2,700,411 A | 1/1955 | Lamb |
| 2,833,367 A | 5/1958 | Pool |
| 2,845,990 A | 8/1958 | Hubert |
| 3,013,837 A | 12/1961 | Pessl |
| 3,066,979 A | 12/1962 | Pitts |
| 3,076,517 A | 2/1963 | Henry-Biabaud |
| 3,182,605 A | 5/1965 | Brasher |
| 3,195,913 A | 7/1965 | Hallsworth |
| 3,223,193 A | 12/1965 | Reynolds |
| 3,254,900 A | 6/1966 | Allen |
| 3,300,172 A | 1/1967 | Noller |
| 3,412,968 A | 11/1968 | Rose |
| 3,437,373 A | 4/1969 | Boston |
| 3,515,432 A | 6/1970 | Sporman |
| 3,542,424 A | 11/1970 | Khan et al. |
| 3,659,895 A | 5/1972 | Dresden |
| 3,690,697 A | 9/1972 | Bohanski |
| 3,693,744 A | 9/1972 | Horn |
| 3,708,203 A | 1/1973 | Barecki et al. |
| 3,709,555 A | 1/1973 | Ostertag |
| 3,727,873 A | 4/1973 | Hill |
| 3,747,723 A | 7/1973 | Peterson |
| 3,893,728 A | 7/1975 | Holopainen |
| 3,926,396 A | 12/1975 | Hall |
| 3,933,224 A | 1/1976 | Nilsson |
| 3,964,713 A * | 6/1976 | Joslyn et al. ............... 248/418 |
| 4,005,845 A | 2/1977 | Luppi |
| 4,008,500 A | 2/1977 | Hall, Jr. |
| 4,026,379 A | 5/1977 | Dunn et al. |
| 4,097,016 A | 6/1978 | Petrucci |
| 4,123,028 A | 10/1978 | Quakenbush |
| 4,134,617 A | 1/1979 | Matsubara |
| 4,227,670 A | 10/1980 | Vander Burgh |
| 4,274,503 A | 6/1981 | Mackintosh |
| 4,278,144 A | 7/1981 | Perin |
| 4,351,562 A | 9/1982 | Twitchell |
| 4,450,927 A | 5/1984 | Hirata |
| 4,480,867 A | 11/1984 | Ezell |
| 4,487,445 A | 12/1984 | Johnston |
| 4,518,139 A | 5/1985 | Barfell |
| 4,552,250 A | 11/1985 | Luebrecht |
| 4,570,997 A | 2/1986 | Tanizaki |
| 4,600,239 A | 7/1986 | Gerstein |
| 4,671,572 A | 6/1987 | Young |
| 4,705,256 A | 11/1987 | Hofrichter |
| 4,730,691 A | 3/1988 | Grigg |
| 4,733,903 A | 3/1988 | Bailey |
| 4,802,706 A | 2/1989 | Onimaru et al. |
| 4,809,180 A | 2/1989 | Saitoh |
| 4,812,838 A | 3/1989 | Tashiro |
| 4,815,785 A | 3/1989 | Goodall |
| 4,846,529 A | 7/1989 | Tulley |
| 4,951,766 A | 8/1990 | Basedow et al. |
| 4,969,685 A | 11/1990 | Chihaya |
| 5,071,160 A | 12/1991 | White et al. |
| 5,118,134 A | 6/1992 | Mattes et al. |
| 5,127,621 A | 7/1992 | Uecker et al. |
| 5,127,699 A | 7/1992 | Maezawa |
| 5,161,765 A | 11/1992 | Wilson |
| 5,341,894 A | 8/1994 | Van Gorder, Jr. |
| 5,346,035 A | 9/1994 | Ueda |
| 5,409,079 A | 4/1995 | Strong |
| 5,482,354 A | 1/1996 | Gryp |
| 5,547,039 A | 8/1996 | Berger et al. |
| 5,568,960 A | 10/1996 | Oleson |
| 5,584,460 A | 12/1996 | Ropp |
| 5,730,236 A | 3/1998 | Miller |
| 5,788,015 A | 8/1998 | Seng |
| 5,839,542 A | 11/1998 | Seng |
| 5,860,488 A | 1/1999 | Kim |
| 5,890,764 A | 4/1999 | Seog |
| 5,895,093 A | 4/1999 | Casey |
| 5,921,340 A | 7/1999 | Abels |
| 5,941,498 A | 8/1999 | Hoshira |
| 5,951,106 A | 9/1999 | Hirama et al. |
| 5,992,935 A | 11/1999 | Duijnstee |
| 6,009,357 A | 12/1999 | Wellman |
| 6,027,170 A | 2/2000 | Benz |
| 6,039,141 A | 3/2000 | Denny |
| 6,064,932 A | 5/2000 | Francois |
| 6,086,142 A | 7/2000 | Simmons |
| 6,168,234 B1 | 1/2001 | Haynes et al. |
| 6,186,573 B1 | 2/2001 | Thurab |
| 6,189,964 B1 | 2/2001 | Henshaw |
| 6,196,630 B1 | 3/2001 | Cheng |
| 6,226,902 B1 * | 5/2001 | Heyne ..................... 37/348 |
| 6,267,071 B1 | 7/2001 | Ellis |
| 6,283,504 B1 | 9/2001 | Stanley et al. |
| 6,302,483 B1 | 10/2001 | Ricaud |
| 6,361,111 B1 | 3/2002 | Bowers |
| 6,446,758 B1 | 9/2002 | Schatz |
| 6,533,076 B1 | 3/2003 | Haverfield |
| 6,533,321 B2 | 3/2003 | Class et al. |
| 6,536,825 B2 | 3/2003 | McAndrew |
| 6,536,842 B2 | 3/2003 | Bowers |
| 6,540,250 B1 | 4/2003 | Peterson |
| 6,543,848 B1 | 4/2003 | Suga et al. |
| 6,563,761 B1 | 5/2003 | Schaffran et al. |
| 6,564,896 B1 | 5/2003 | Proksch |
| 6,564,906 B1 | 5/2003 | Haack |
| 6,572,172 B1 | 6/2003 | Ninomiya et al. |
| 6,578,854 B2 | 6/2003 | Wucherfennig |
| 6,678,601 B2 | 1/2004 | Whinnery |
| 6,679,349 B1 | 1/2004 | Pollish |
| 6,694,240 B1 * | 2/2004 | Swick et al. ................. 701/50 |
| 6,731,088 B2 | 5/2004 | Nivet |
| 6,814,174 B2 | 11/2004 | Fluent et al. |
| 2002/0125988 A1 | 9/2002 | Nagasaka |
| 2002/0145315 A1 | 10/2002 | Fraley et al. |
| 2003/0001404 A1 | 1/2003 | Michel |
| 2003/0019684 A1 | 1/2003 | Wucherpfennig |
| 2003/0057755 A1 | 3/2003 | Brandt |
| 2003/0062753 A1 | 4/2003 | Chao |
| 2003/0090133 A1 | 5/2003 | Nathan et al. |
| 2003/0127272 A1 | 7/2003 | Baker |
| 2003/0189370 A1 | 10/2003 | Hemmer |
| 2003/0230447 A1 | 12/2003 | Wulfert |
| 2003/0230920 A1 | 12/2003 | Itou |
| 2004/0080204 A1 | 4/2004 | Enomoto et al. |
| 2004/0173409 A1 | 9/2004 | Hock |
| 2004/0211616 A1 | 10/2004 | Ueda et al. |
| 2004/0262961 A1 | 12/2004 | Young et al. |
| 2005/0006939 A1 | 1/2005 | Hancock et al. |
| 2005/0073184 A1 | 4/2005 | Tsuji et al. |

FOREIGN PATENT DOCUMENTS

| | | |
|---|---|---|
| DE | 3317340 A1 | 11/1984 |
| DE | 36 25 057 A1 | 1/1988 |
| DE | 4203150 A1 | 8/1993 |
| DE | 4309894 A1 | 10/1993 |
| DE | 4415933 A1 | 11/1994 |
| DE | 19512284 A1 | 10/1996 |
| DE | 19730131 | 4/1999 |
| DE | 19650338 | 7/1999 |
| DE | 19742666 A1 | 8/1999 |
| DE | 10050580 A1 | 4/2001 |

| | | | |
|---|---|---|---|
| DE | 20213 915 U1 | 2/2003 | |
| EP | 0369951 B1 | 9/1992 | |
| EP | 0317520 B1 | 6/1993 | |
| EP | 0 670 239 A1 | 9/1995 | |
| EP | 0600453 B1 | 5/1996 | |
| EP | 0548450 B1 | 8/1996 | |
| EP | 0847893 A2 | 6/1998 | |
| EP | 0960850 A2 | 12/1999 | |
| EP | 1002760 A1 | 5/2000 | |
| EP | 1070627 A2 | 1/2001 | |
| EP | 0988249 B1 | 3/2001 | |
| EP | 1186466 A1 | 3/2002 | |
| EP | 1260477 A1 | 11/2002 | |
| EP | 1264940 A1 | 12/2002 | |
| EP | 0812722 B1 | 5/2003 | |
| EP | 1367474 A2 | 12/2003 | |
| EP | 1386777 A1 | 4/2004 | |
| FR | 2544973 | 11/1984 | |
| FR | 2678871 | 1/1993 | |
| FR | 2690320 A1 | 10/1993 | |
| FR | 2776583 | 1/1999 | |
| FR | 2796014 | 1/2001 | |
| FR | 2828846 | 2/2003 | |
| FR | 2828847 | 2/2003 | |
| GB | 1022623 | 3/1966 | |
| GB | 2301620 B | 7/1997 | |
| GB | 2301026 B | 2/1999 | |
| GB | 2300119 B | 3/1999 | |
| GB | 2308058 B | 6/1999 | |
| GB | 2345633 B | 9/2000 | |
| GB | 2 396 102 A | 6/2004 | |
| JP | 58101832 | 6/1983 | |
| JP | 3178839 | 8/1991 | |
| JP | 4300738 | 10/1992 | |
| JP | 04358931 A | 12/1992 | |
| JP | 06001171 A | 1/1994 | |
| WO | WO 96/10817 A1 | 4/1996 | |
| WO | WO 01/64576 A1 | 9/2001 | |
| WO | WO 01/68400 A1 | 9/2001 | |
| WO | WO 02/40311 A1 | 5/2002 | |

OTHER PUBLICATIONS

Crown specification brochure entitled 40TSP Turret Sideloader, 4000 lb capacity, Series TS, SF12182, Rev. Jul. 2000.
Raymond advertisement brochure No. SIPD-0046 30M CP entitled EASi Operator-Up Swing-Reach Truck for Maximum Productivity and Flexibility, Jun. 1995 USA.
Yale advertisement brochure No. 2447-1/01-30 entitled Yale Very Narrow Aisle, 2001 USA.
OM Pimespo advertisement brochure entitled Turret Trucks (man up) Dual, 5 pgs.
Linde advertisement brochure entitled Electric Man-up Combination Truck (Order Picking/Turret) 1000 kg., 2 pgs.
Jungheinrich advertisement brochure entitled The new Jungheinrich High Rack and Order Picking Stacker ETX-KOMBI 125/150K/150 L, 2 pgs.
Hyster Company advertisement brochure V30-35/XMU Turret Trucks, Introducing: The Vanguard of High Density; Part No. V3U-35BTG Jan. 1999.
Dambach advertisement brochure entitled Order Picking Stackers The Hi-Racker, Sep. 2000, Germany, 8 pgs.
Narrow Aisle Limited advertisement brochure entitled Combi Double Deep, 1994, England, 2 pgs.
Jungheinrich advertisement brochure entitled 3 Phase AC, Germany.
News article featuring Translift's Bendi BE40.
Crown Operator Manual No. PF12495 Rev. Apr. 2001 entitled Crown T3 Series, USA.
Crown advertisement brochure No. SF4312 Rev. Jun. 1998 entitled Turret Sideloader, USA.
Linde advertisement brochure entitled Electric Man-up Combination Truck (Order Picking/Turret 1350 kg.
Translift photographs of Smart Bendi Task Positionable Swing Cabs.
Valtra photographs of Task Positionable Swing Seat.
Fiori Spa advertisement brochure for D40 dumper, Italy.
Valtra photographs for Ergocab and TwinTrac.
New Holland photographs of the TV 140 Turnabout console.
Magazine article from iVT International, Sep. 2002, showing Still's R60 counterbalance trucks, 1 pg.
Jungheinrich advertisement brochure entitled Jungheinrich High Rack Stacker Capacity 1250 kg ETXac 125, 1 pg.
Advertisement for ACROBA, 1 pg.
Photograph of a CAT seat, 1 pg.
Vermeer rotating seat Advertisement, 1 pg.
Crown specification brochure No. SF12183 entitled TSP Series turret stockpicker, Apr. 2002 USA.
Crown Operator Manual for TSP Series No. PF12496 Jul. 2001, USA.
Crown specification brochure for model 30TSP Turret Stockpicker, 3000 lb. capacity, 5 pgs.

* cited by examiner

ROTATING AND/OR SWIVELING SEAT

CROSS REFERENCE TO RELATED APPLICATIONS

The present application is a divisional of U.S. patent application Ser. No. 10/948,500, filed Sep. 23, 2004, U.S. Pat. No. 7,121,608, issued Oct. 17, 2006 entitled "Rotating And/Or Swiveling Seat". The present application is also related to U.S. Pat. No. 7,059,680, entitled "Seat Repositioning Device With Release On Control Handle" and U.S. patent application Ser. No. 11/375,172, a continuation application thereof, entitled "Seat Repositioning Device With Release On Control Handle", all of which are hereby incorporated by reference.

BACKGROUND OF THE INVENTION

The present invention relates in general to working vehicles such as materials handling vehicles, construction vehicles and agricultural vehicles, and more particularly to an operator's seat that is capable of swiveling and/or rotating, and to control systems that interact with the operator's seat to affect control of features of the vehicle.

Materials handling vehicles typically include a platform having an operator's seat and a number of control elements located in the vicinity of the seat within reach of the operator's hands and/or feet. The control elements typically include steering and traction controls for navigating the vehicle and various switches and levers, which are provided for operating the load handling features of the vehicle. In a first type of materials handling vehicle, such as a Crown turret stockpicker (TSP), the operator's seat is oriented such that an operator sits or stands in a forward facing position, i.e., facing the forks of the vehicle, so that it is easier for an operator to pick parts (stock pick) from the vehicle. The turret stockpicker can travel down narrow warehouse aisles to pick up and put away stock from either side of a given aisle. During such operations however, a head turn or other maneuver may be required to be able to see to the sides, and rear of the vehicle.

In a second type of materials handling vehicle, such as a Crown turret sideloader (TS), an operator's seat is provided to one side of an operator's compartment facing approximately 90 degrees with respect to the forward facing position of the vehicle. A seated operator is thus considered to be in a "side facing" position, i.e., facing the side of the vehicle. The operator also has forward and rearward visibility by a head turn in the appropriate direction. The side facing position allows the operator to see around a mast centered on the vehicle, and provides more free space within the operator's compartment. However, the operator's head must be turned while driving the vehicle. Moreover, stockpicking from the second type of materials handling vehicle is typically not feasible.

SUMMARY OF THE INVENTION

The present invention combines the functionality and convenience of a side facing operator's seat with the functionality and convenience of a forward facing operator's seat in a sit down or stand/sit vehicle, e.g., a turret truck or a forklift truck, by providing an operator's seat that is capable of swiveling, rotating, or both. Further, control systems of the vehicle may interact with the operator's seat to control features of the vehicle.

According to one embodiment of the present invention, an operator's seat of a vehicle comprises a base structure and an operator support. The base structure allows the operator's seat to be rotated with respect to a platform floor of an operator's compartment within the vehicle. For example, the operator's seat may be repositionable from approximately a front facing position up to approximately a side facing position. Optionally, the operator's seat may be capable of rotating to additional positions beyond the range of front facing to side facing positions, e.g., the operator's seat may be capable of 360 degrees of rotation. Moreover, the operator's seat may be adjustable to a number of discrete intermediate positions, or the operator's seat may be continuously adjustable.

The operator support includes a seat bottom upon which the vehicle operator may sit, and a seat back that provides back support to the operator in both sitting and standing operating positions. The operator's seat further includes armrests and one or more control elements provided on control handles on the armrests. The operator support is coupled to the base structure of the operator's seat by a swivel structure that allows the operator support to swivel relative to the base structure. As such, the seat back and seat bottom can swivel relative to the armrest and base structure. The armrests may alternatively be included with the operator's support such that the armrests swivel with the seat bottom and seat back. The operator's seat thus provides a dual swiveling and rotating action, each individually controlled by the operator.

According to another embodiment of the present invention, an operator's compartment of a materials handling vehicle comprises an operator's seat having an operator support and a base structure. The base structure allows the operator's seat to be rotated with respect to a platform floor of the compartment. The position of the operator's seat is sensed and the seat position is input to a control module. One or more presence sensing devices is further provided as input to the control module to sense the presence or absence of an operator, e.g., by sensing a corresponding foot, feet, or leg(s) of the vehicle operator. Where multiple presence sensing devices are used, select ones of the presence sensing devices may implement differing functionalities depending upon the rotated position of the operator's seat. The operational control of the vehicle travel, direction, load handling features, and/or other features of the vehicle are selectively enabled, disabled, limited or otherwise controlled by the control module based upon any one or more of the inputs to the control module.

BRIEF DESCRIPTION OF THE SEVERAL VIEWS OF THE DRAWINGS

The following description of the preferred embodiments of the present invention can be best understood when read in conjunction with the following drawings, where like structure is indicated with like reference numerals, and in which.

DETAILED DESCRIPTION OF THE INVENTION

In the following description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
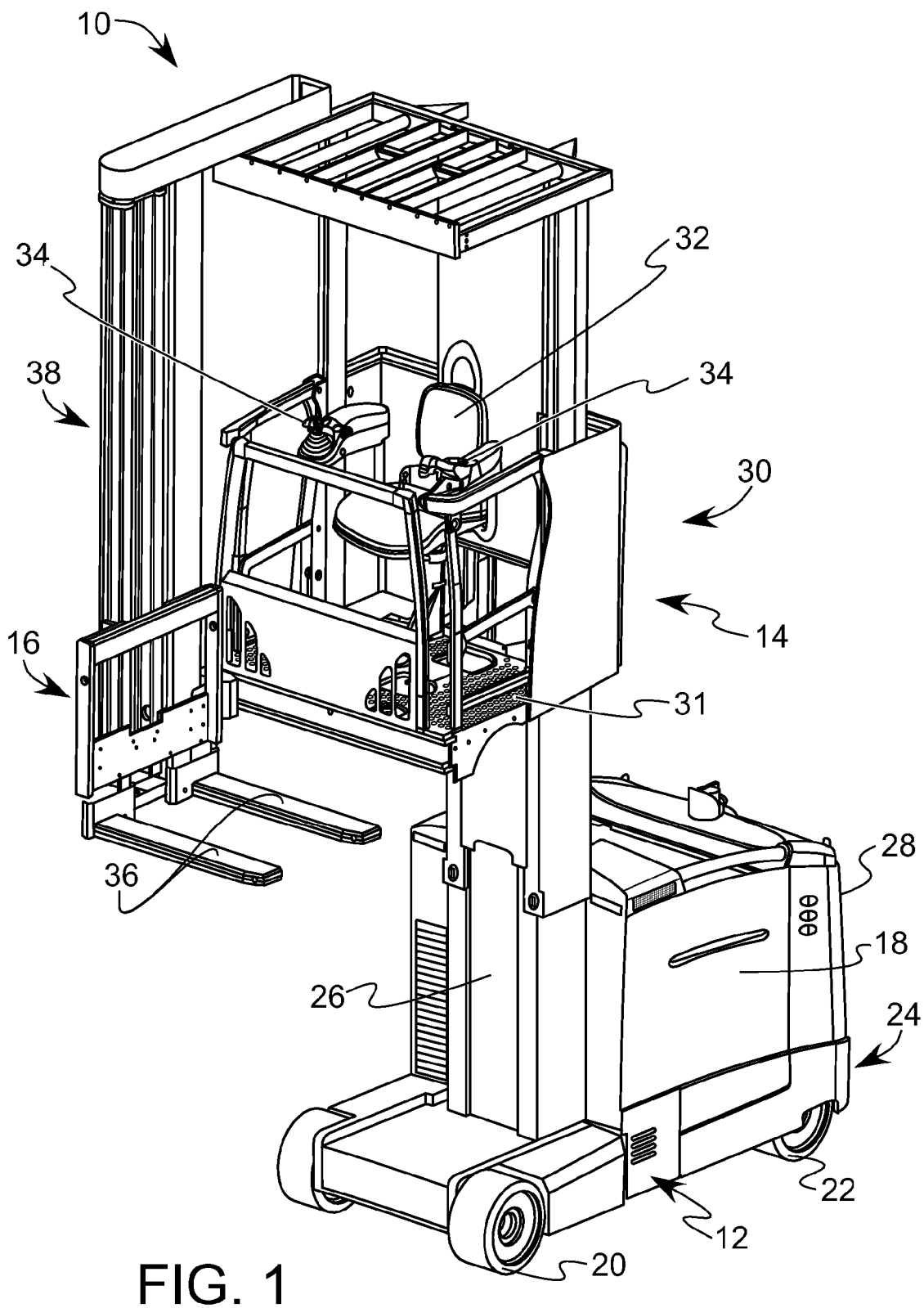
FIG. 1 is a perspective view of an exemplary materials handling vehicle according to the present invention.

Referring now to the drawings, and particularly to FIG. 1, a materials handling vehicle 10, such as a turret stockpicker, typically includes a power unit 12, an operator platform assembly 14, and a load handling assembly 16. The power unit 12 includes a first compartment 18 for housing a power source, such as a battery, a pair of load wheels 20 positioned under the operator platform assembly 14, one or more drive wheels 22 (a pair of drive wheels 22 are shown) positioned under the rear end 24 of the power unit 12, a main mast 26 on which the operator platform assembly 14 may be raised and lowered, and an electronic control unit 28 that typically controls one or more traction motors (not shown), each traction motor corresponding to an associated drive wheel 22.

The platform assembly 14 includes an operator's compartment 30 having a platform floor 31, an operator's seat 32 and a plurality of control elements 34 for driving the vehicle 10, controlling the features of the load handling assembly 16 and for performing other tasks related to the operation of the vehicle 10. In FIG. 1, the control elements 34 are shown as being positioned on the armrests of the operator's seat 32. However, control elements 34 may also be positioned proximate to the operator's seat 32 and foot actuated controls such as vehicle brake, direction and acceleration pedals can be placed on the platform floor 31. Additionally, buttons, levers and other controls may be panel mounted or otherwise positioned within the operator's compartment 30, preferably within arm's reach of an operator sitting in the operator's seat 32.

The load handling assembly 16 includes a pair of lift forks 36 that may be raised and lowered along an auxiliary mast 38. Moreover, the auxiliary mast 38 may be traversed back and forth across the front of the operator's compartment 30, and the lift forks 36 may be rotated in an arc of approximately 180 degrees relative to the auxiliary mast 38.

Figure 2:
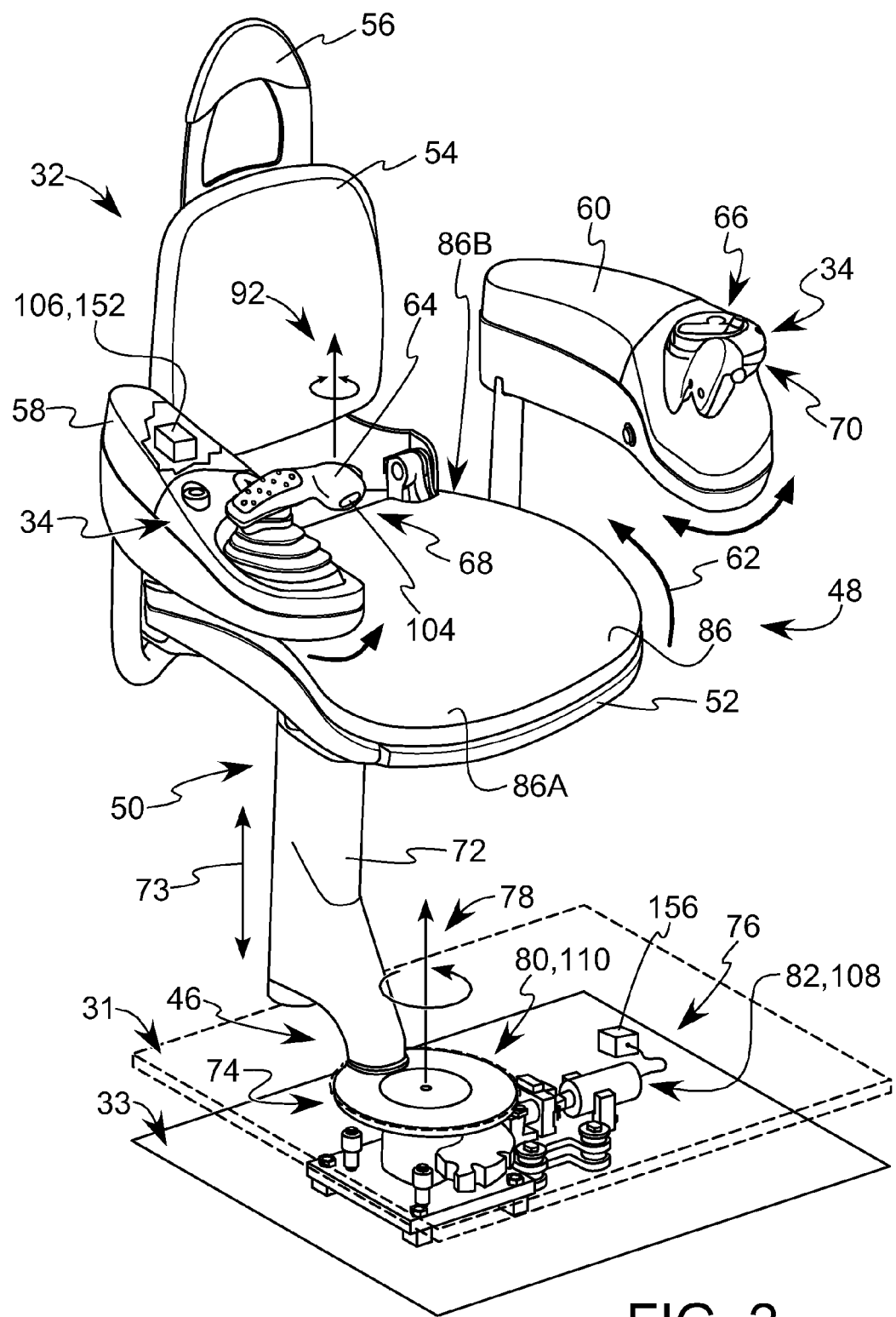
FIG. 2 is a perspective view of an operator's seat illustrating one aspect of the present invention.

Referring to FIG. 2, the operator's seat 32 includes generally, a base structure 46 coupled to an operator support 48 by an intermediate member 50. The operator support 48 comprises a seat bottom 52, a seat back 54, and a head rest 56. The seat bottom 52 may be hingedly supported so as to be repositionable from a substantially horizontal position or seat down position (as shown), to a substantially vertical position or seat up position (see FIG. 4A) by pivoting the seat bottom 52 in the direction of arrow 62. In the seat down position, the seat bottom 52 provides a suitable support surface upon which the vehicle operator may sit. In the seat up position, the seat bottom 52 provides a suitable support surface upon which the vehicle operator may lean against when the vehicle operator is operating the vehicle in a standing position.

The operator's seat further includes a right armrest 58 and a left armrest 60. The armrests 58, 60 optionally pivot or are otherwise repositionable with respect to the seat bottom 52 and seat back 54. For example, the right armrest 58 may be mounted for inward pivotal movement and the left armrest 60 may be mounted for both outward and inward pivotal movement as indicated by the directional arrows adjacent to each armrest 58, 60, where outward pivotal movement is defined as being away from the seat bottom 52. The above arrangement allows the left armrest 60 to be moved out and away from the seat bottom 52 for ease of ingress and egress to the operator's seat 32, e.g., when performing tasks such as parts picking where the operator requires mobility within the compartment 30. Additionally, as noted above, the seat bottom 52 is mounted for vertical pivoting movement in the direction of arrow 62 relative to the seat back 54 (between seat up and down positions), which, in combination with the ability to reposition the armrests 58, 60, facilitates standing and seated operation of the vehicle 10 while maintaining easy access to the operative control elements 34 in either position.

The right and left armrests 58, 60 may each include a plurality of control elements 34 that are operatively configured to control designated functions related to the operation of the vehicle 10. The control elements 34 may include for example, buttons, levers, switches, joysticks, jog wheels, throttles, potentiometers, encoders and other controls, and collectively provide the functionality necessary to navigate the vehicle, operate the load handling features of the vehicle, and/or operate other features related to the performance of specific tasks. For example, the control elements 34 may comprise a traction control arm 64 for controlling direction of movement as well as acceleration and deceleration of the vehicle 10, and a steering tiller 66, e.g., a finger operated tiller disk having a pop-out handle, for steering the vehicle 10. The traction control arm 64 and the steering tiller 66 may thus be operated in combination with brake pedal(s) 99 (shown in FIG. 5) to drive the vehicle 10.

Lever controls 68, 70 may provide variable control between predetermined minimum and maximum values for controlling traversing and rotation of the forks 36, and/or raising and lowering the primary and auxiliary masts 26, 38. Integrated hand sensors 71 (see FIG. 3), e.g., optical sensing elements, may be provided in the lever controls 68, 70 (or any of the other control elements 34) to ensure that the operator's hands are maintained within the operator's compartment 30 during predetermined operations, e.g., while performing certain load handling functions. Moreover, control elements 34 may be provided to operate other command and control features, such as to sound a horn or other audible or visual signal, to operate a fan, communications link, light, scanner technology, or provide any other desired function necessary to perform a given task.

The intermediate member 50 includes generally, a first frame member 72 that extends substantially vertically between the base structure 46 and the operator support 48. The intermediate member 50 allows the height of the seat bottom 52 and seat back 54 to be adjustable as indicated by directional arrow 73, e.g., using a gas cylinder (not shown), to accommodate the varying physical characteristics of anticipated vehicle operators. The ability to adjust the height of the seat bottom 52 further allows the operator to reposition the control elements on the right and left armrests 58, 60 to an appropriate position when operating the vehicle 10 in standing or sitting positions.

The base structure 46 comprises a mounting member 74 that couples the first frame member 72 to a seat release system 76. The seat release system 76 allows the operator's seat 32 to be rotatable (at least partially) about a substantially vertical first axis 78 as will be explained in greater detail below. The seat release system 76 is located underneath the platform floor 31 and may be bolted or otherwise secured to a platform base 33 or other suitable structure. Thus the mounting member 74 is generally coplanar relative to the platform floor 31. The seat release system 76 comprises a locking arrangement that includes generally, a rotate assembly 80 and a release assembly 82 as shown. The rotate assembly 80 may include one or more designated locking positions such that when the operator's seat 32 is transitioned to a select one of the designated locking positions and the release assembly 82 is not activated, the operator's seat 32 is locked into that designated position. Correspondingly, the release assembly 82 is operable to unlock the rotate assembly 80 for repositioning the operator's seat 32 with respect to the platform floor 31. When the operator's seat 32 is repositioned into a new one of the designated locking positions and the release assembly 82 is deactivated, the operator's seat is locked into position. If the release assembly 82 is deactivated before the operator's seat 32 is oriented with respect to one of the designated locking positions, the operator's seat 32 may lock into the next encountered locking position.

Figure 10:
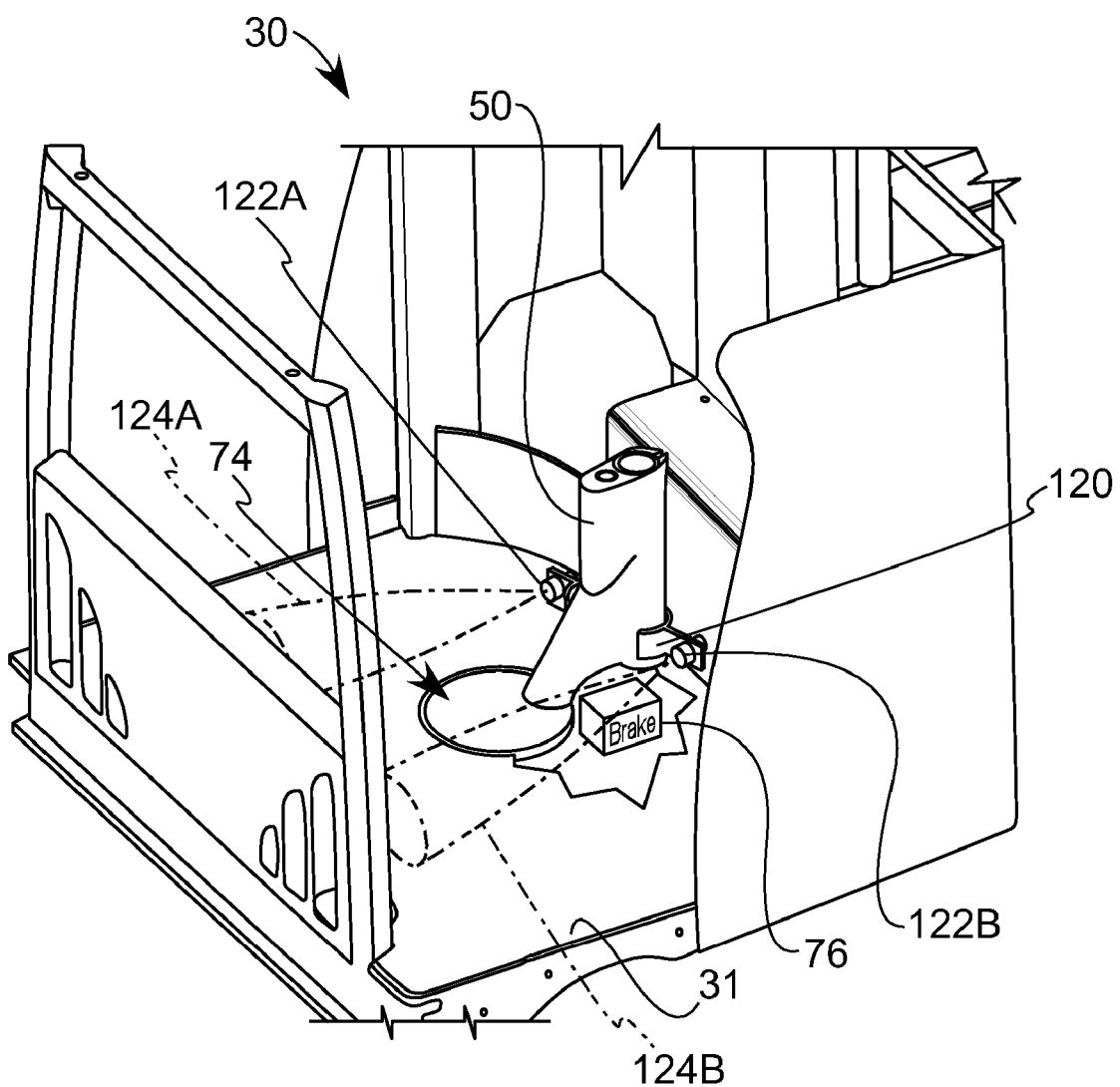
FIG. 10 is a partial perspective view of an operator's compartment with the operator's support of the seat removed to illustrate presence sensing devices according to another aspect of the present invention.

As an alternative to designated locking positions, the seat release system 76 may comprise a brake arrangement that allows the operator's seat to be lockable in an infinitely variable number of positions, as schematically represented in FIG. 10. Exemplary implementations of the seat release system 76 are set out in U.S. Pat. No. 7,059,680 entitled "Seat Repositioning Device With Release On Control Handle", which is incorporated by reference herein.

Figure 6:
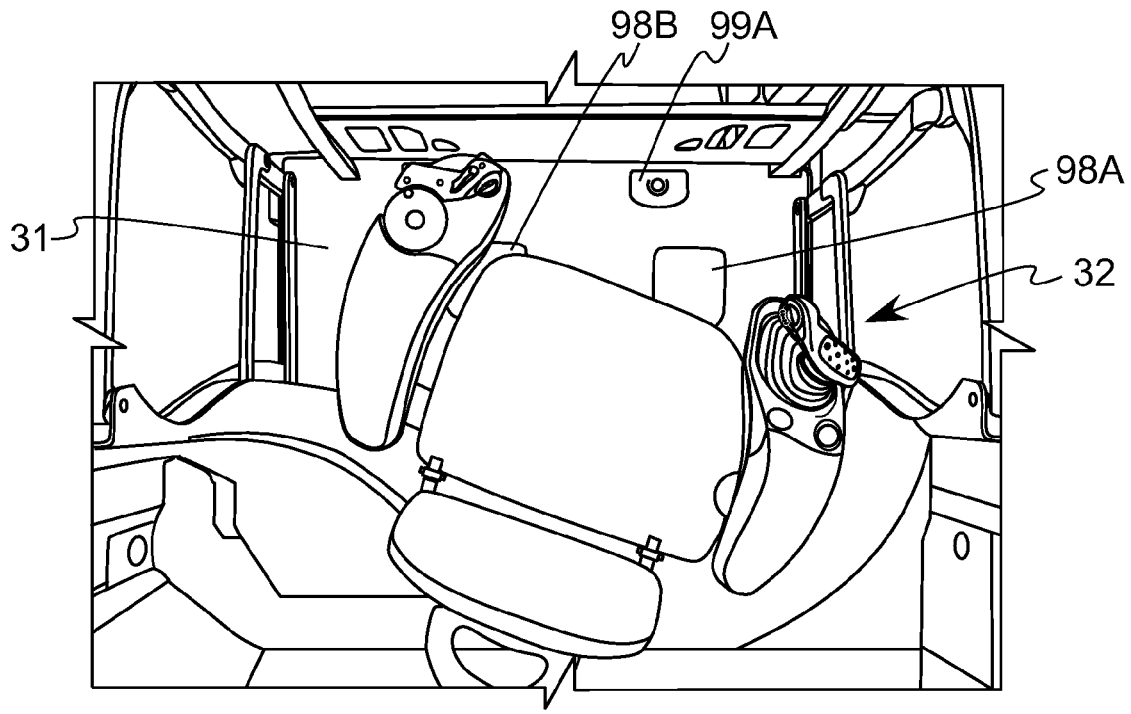
FIG. 6 is a top view of the operator's compartment of FIG. 5, showing the operator's seat in an exemplary first position.
Figure 7:
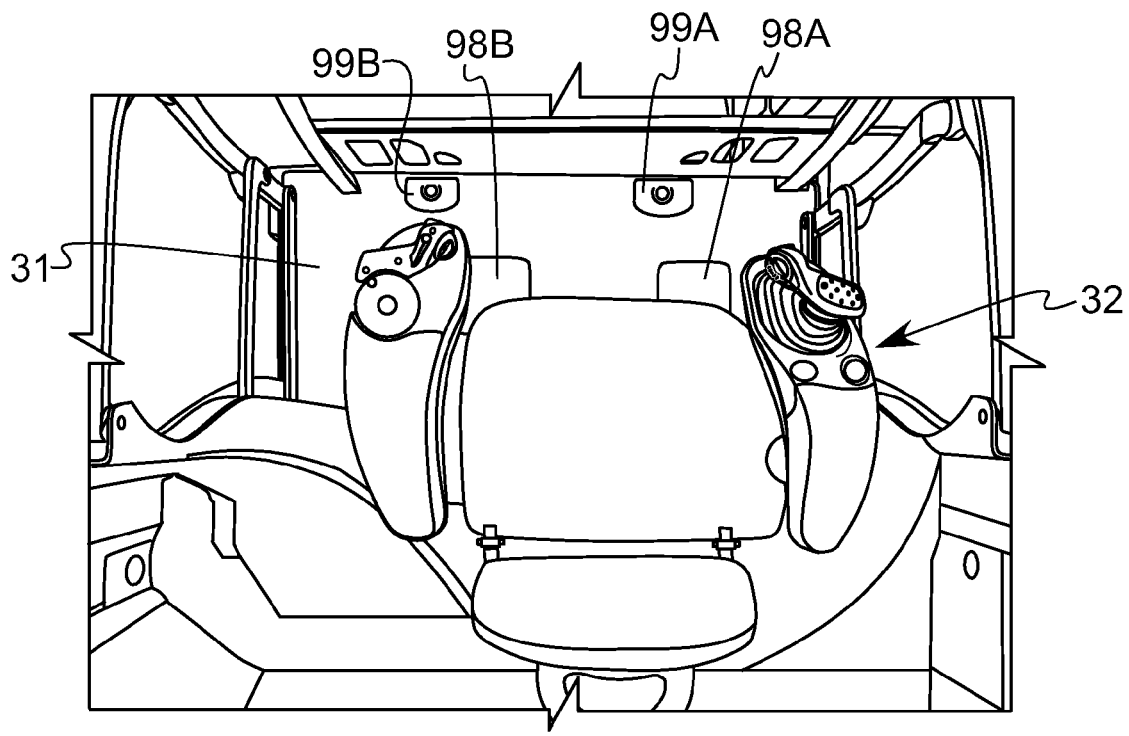
FIG. 7 is a top view of the operator's compartment of FIG. 5, showing the operator's seat in an exemplary second position, which also defines a forward facing position.
Figure 8:
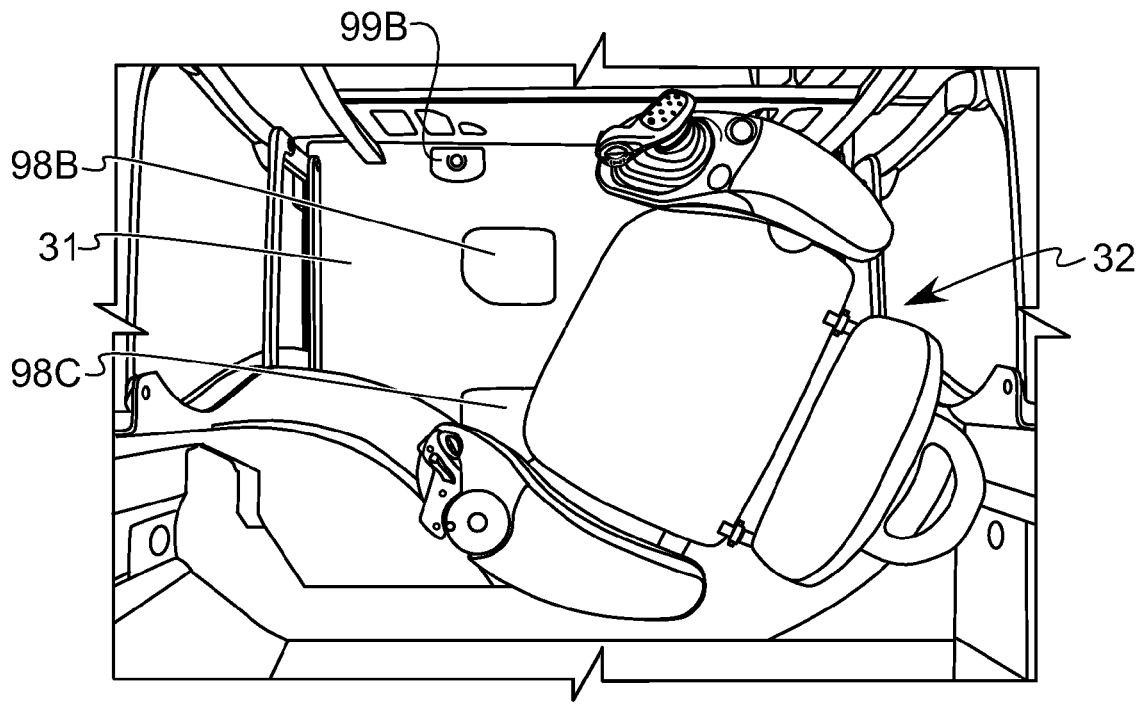
FIG. 8 is a top view of the operator's compartment of FIG. 5, showing the operator's seat in an exemplary third position.
Figure 9:
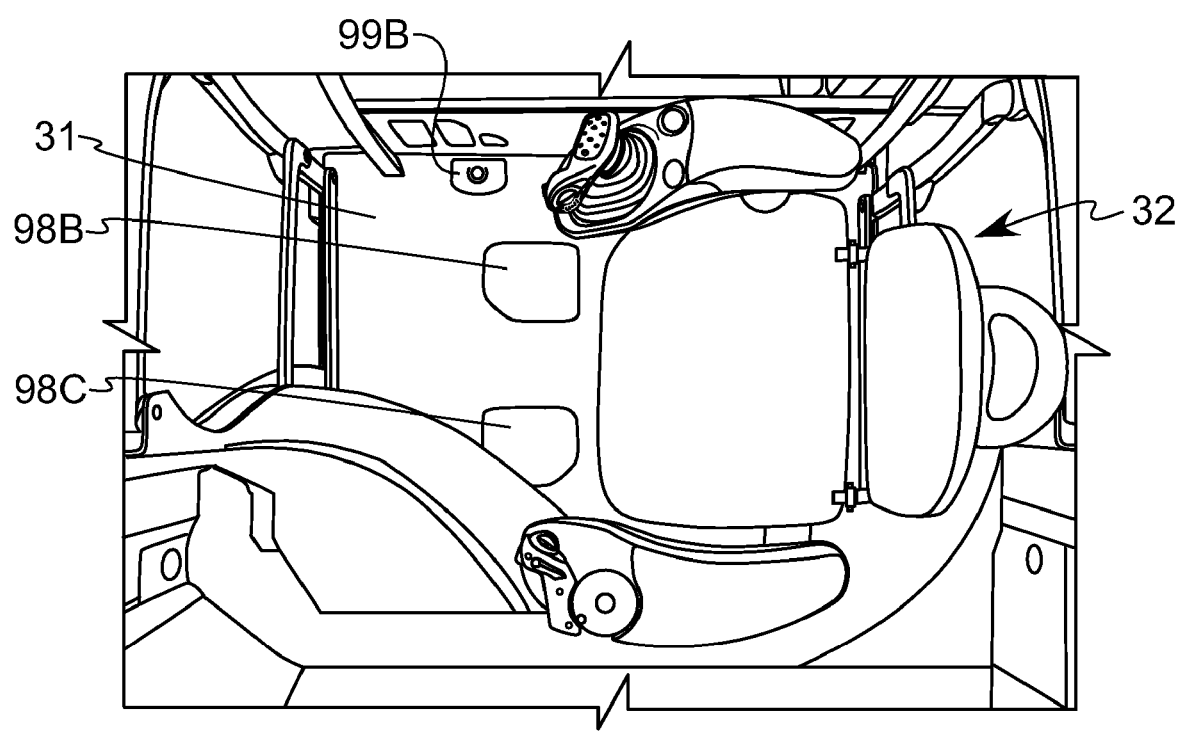
FIG. 9 is a top view of the operator's compartment of FIG. 5, showing the operator's seat in an exemplary fourth position, which also defines an exemplary side facing position.

In one exemplary working implementation of the seat release system 76, the operator's seat 32 is repositionable over a range of approximately 110 degrees, and includes four locking positions. A first locking position, designated herein as the −20 degrees position, is provided in which the operator's seat 32 is rotated nominally 20 degrees from the forward facing position (facing the forks of the vehicle) in a first direction, an example of which is seen in FIG. 6. A second locking position, designated herein as the 0 degrees position, is provided in which the operator's seat 32 is rotated nominally to the forward facing position, i.e., wherein the operator's seat 32 faces the forks of the vehicle 10 as seen in FIG. 7. A third locking position is designated herein as the 60 degrees position in which the operator's seat 32 is rotated nominally 60 degrees with respect to the forward facing position in a second direction opposite of the first direction as seen in FIG. 8. A fourth locking position is designated herein as the 90 degrees position in which the operator's seat 32 is rotated nominally 90 degrees with respect to the forward facing position in the second direction as seen in FIG. 9. The fourth locking position is also designated the side facing position. Of course, a greater or lesser range of rotation, and an alternative number of locking positions may be provided. Moreover, the locking positions may be provided anywhere along the range of rotation of the operator's seat 32.

Figure 3:
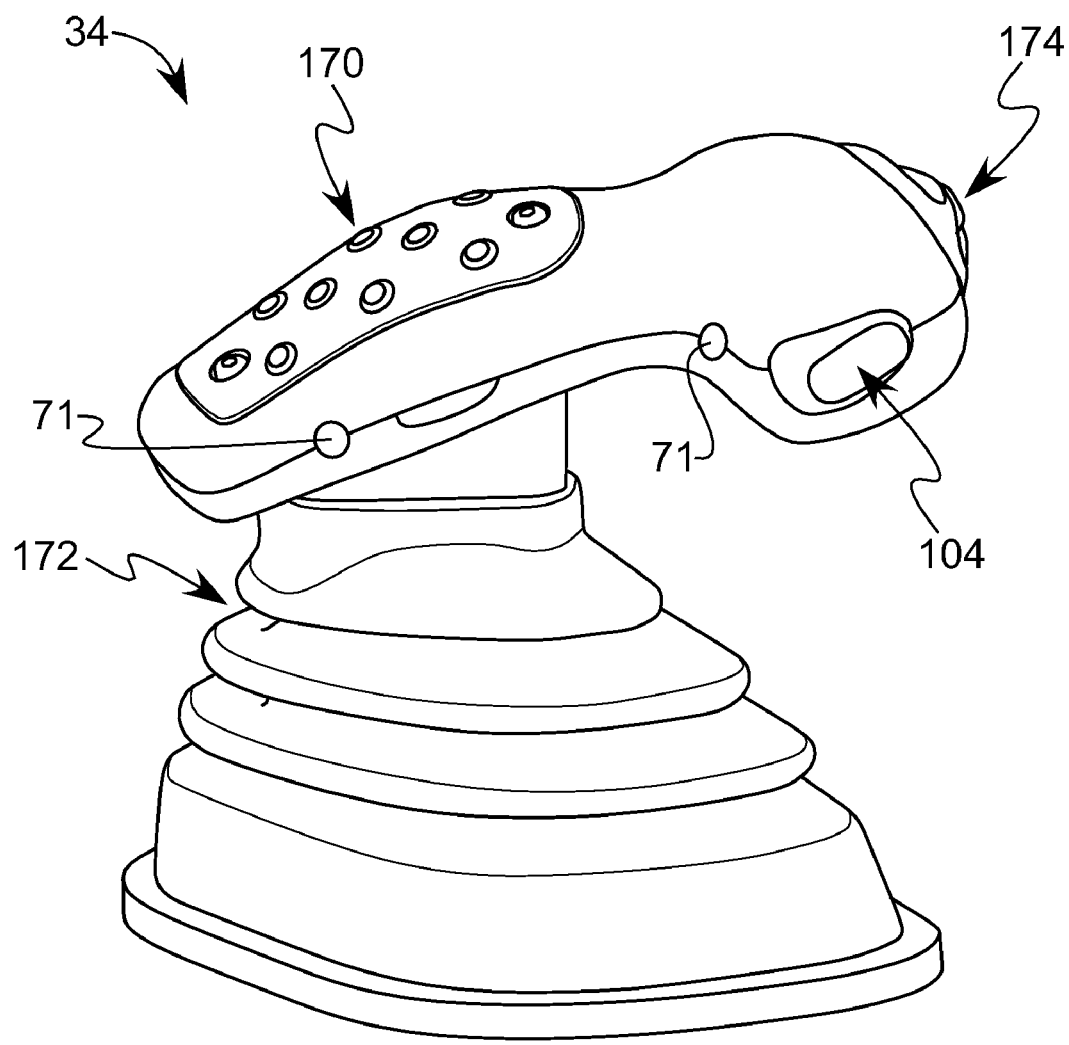
FIG. 3 is a perspective view of a control element on a control handle of the operator's seat of FIG. 2 for controlling the base structure.

Referring to FIGS. 2 and 3, a control element 104 is provided on the right armrest 58 of the operator's seat 32 for controllably causing the release assembly 82 to unlock with respect to the rotate assembly 80. Once unlocked, the operator's seat 32 may be rotated to a new position with respect to the platform floor 31. The control element 104 may further be positioned in any practical manner that is accessible to the vehicle operator. However, the placement of the button as illustrated in FIG. 3 is convenient from an operational perspective. It can be seen that the palm of the operator's right hand will typically be resting upon a textured portion of a handle 170 of a joystick 172. When so positioned, the integrated hand sensors 71 detect the presence of the operator's hand upon the joystick 172. The operator's right thumb is positioned to easily operate a thumb-operated control 174. The operator can thus reach (and actuate) the control element 104 by simply lifting and repositioning the right index finger. This can be accomplished without removing the right hand from an operative position with respect to the other controls that may be present on the handle 170, e.g., the joystick 172 and the thumb-operated control 174. The control element 104 may be coupled to a module 106 (shown in FIGS. 2 and 11) that includes the necessary logic, including hardware and/or software, to operate the release assembly 82 as will be explained in greater detail below.

Figure 4A:
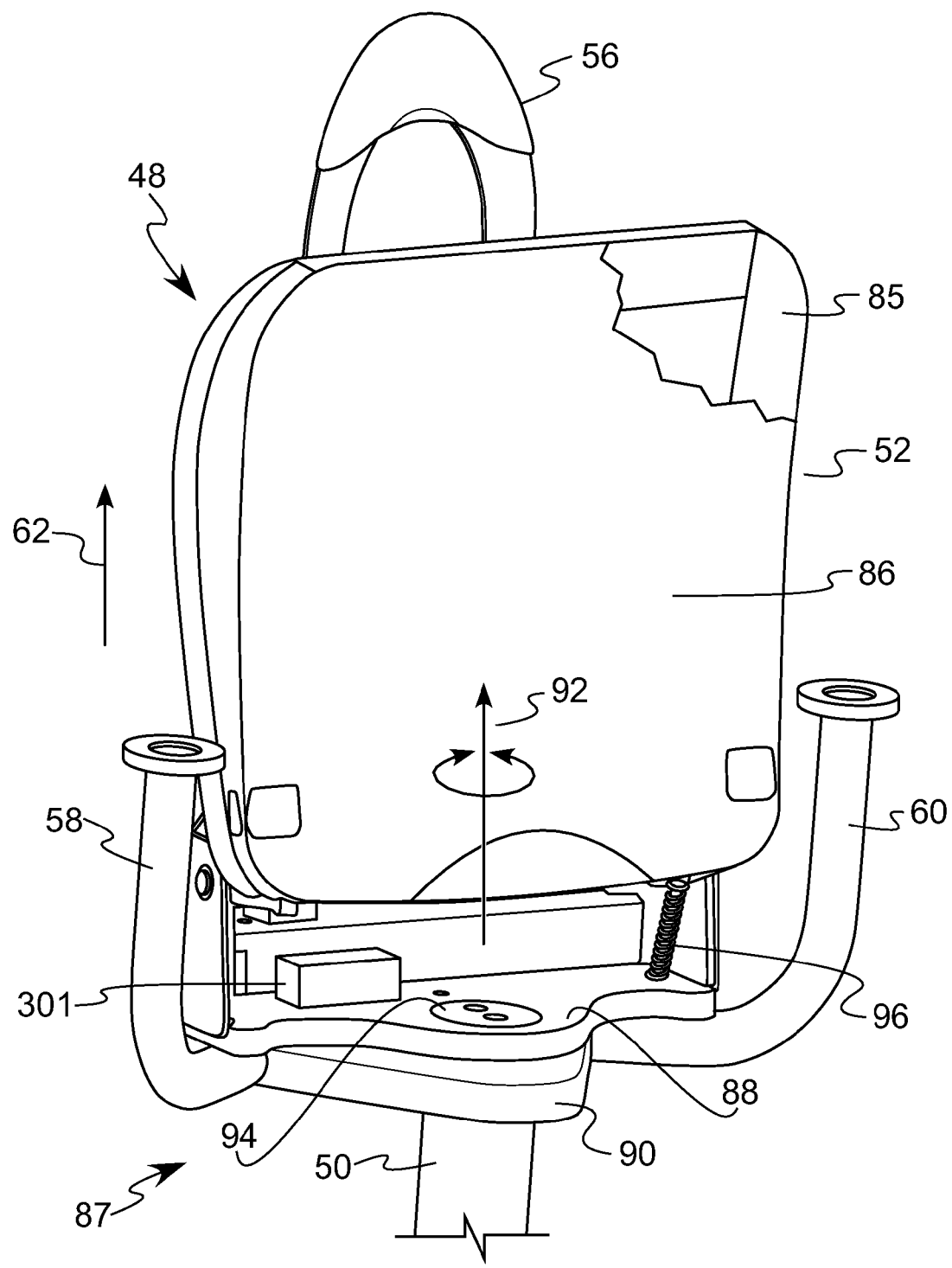
FIG. 4A is a perspective view of the operator's seat shown in FIG. 2, wherein a seat bottom is folded up to illustrate a swivel structure according to another aspect of the present invention.

Referring to FIG. 4A, the operator support 48 of the operator's seat 32 is illustrated with the seat bottom 52 in the seat up position. Also, in FIG. 4A, a portion of the right and left armrests 58, 60 are removed for clarity of discussion. The seat bottom 52 comprises a seat frame 85 covered by a seat cushion 86, which is shaped so as to provide support to the operator when the operator is seated and when the operator is leaning against the seat bottom when the seat bottom is in the seat up position as shown. The operator support 48 is mounted to the intermediate member 50 by a swivel structure 87. The swivel structure 87 allows the operator support 48 to swivel with respect to the intermediate member 50 and to the base structure 46, which is shown in FIG. 2. The swivel structure 87 comprises a carriage mount 88 and a corresponding mounting member 90. The carriage mount 88 cooperates with the mounting member 90 such that the operator support 48 can swivel about a second, substantially vertical axis 92 (best seen in FIGS. 2 and 4A) with respect to the intermediate member 50 and base structure 46. The swiveling action of the swivel structure 87 is preferably independent of the rotating action of the operator's seat 32 with respect to the platform floor 31 via the seat release system 76 shown in FIGS. 2 and 10. The operator support 48 further optionally includes a biasing device 96, e.g., a spring, that holds the seat bottom 52 in either the seat up position (shown in FIG. 4A) or the seat down position (shown in FIG. 2).

As shown, a bearing 94, e.g., a thrust bearing, provides the swivel action between the carriage mount 88 and the mounting member 90. However, other arrangements including different bearing types may be used to implement the swivel action. The carriage mount 88, mounting member 90, bearing 94 and intermediate member 50 preferably cooperate to bias the seat bottom 52 towards a predetermined position, e.g., a centered position, unless acted upon by the operator to cause the operator support 48 to swivel relative to the base structure 46. Thus, when the operator releases a swiveling force, the operator support 48 preferably tends back to its predetermined (centered) position.

Figure 4B:
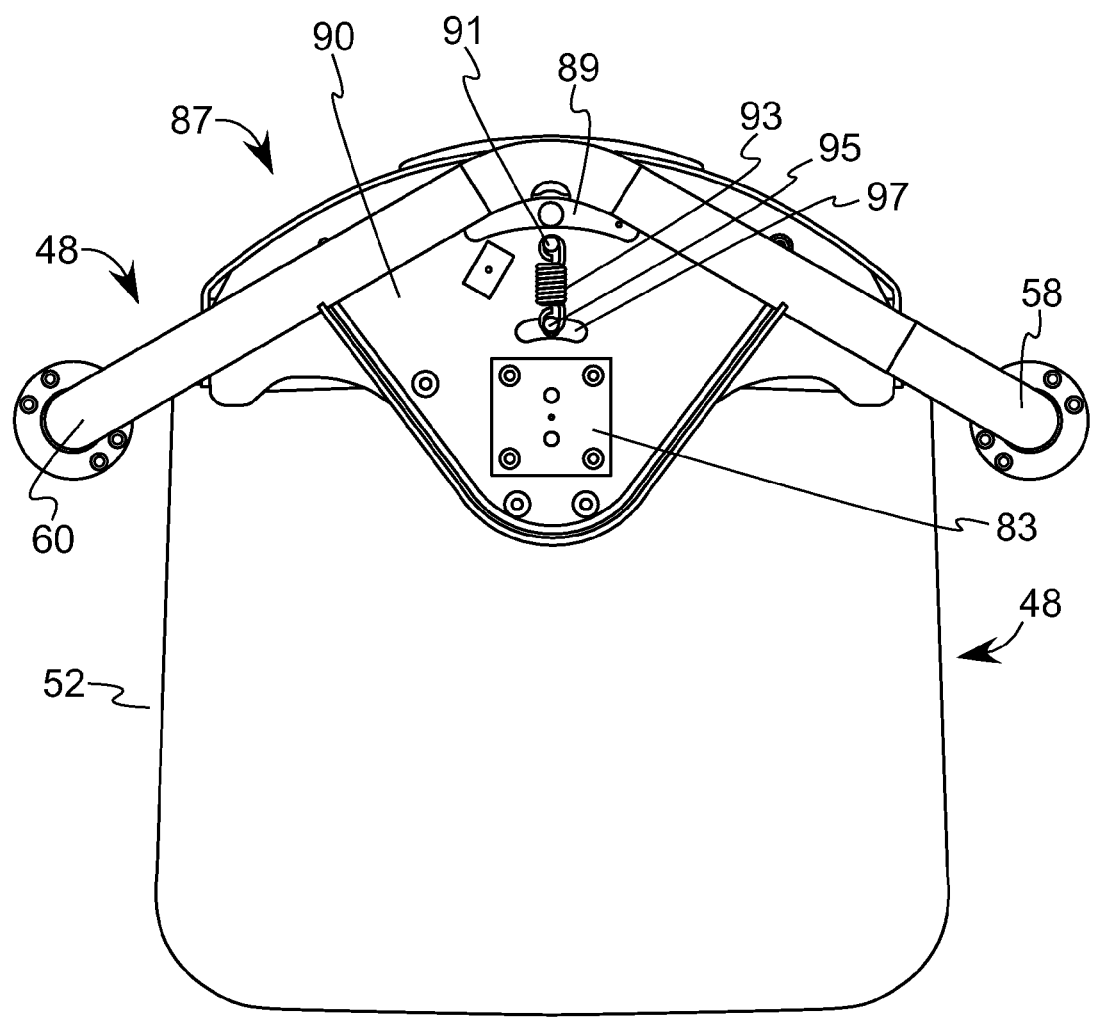
FIG. 4B is a bottom view of the operator's seat shown in FIG. 4A with the seat bottom folded down and with parts of the armrests removed for clarity.

FIG. 4B is a bottom view of the operator's seat 32 and illustrates one exemplary approach to centering the operator support 48. As shown, the intermediate member 50 has been removed from a corresponding member support 83 for clarity of discussion. The mounting member 90 includes a first pin 91 that supports a first end of a biasing member 93, e.g., a spring. A second pin 95 is coupled to the underside of the carriage mount 88 and projects through a slot 97 in the mounting member 90. The second pin 95 supports a second end of the biasing member 93.

Also, as illustrated in FIG. 4B, the armrests 58, 60 are coupled to the mounting member 90 by a bracket 89 or other suitable support structure. As noted above, the operator support 48 is secured to the carriage mount 88. The carriage mount 88 swivels relative to the mounting member 90. Thus, if an operator desires a swivel action, the operator support 48 including the seat bottom 52 and seat back 54, will swivel relative to the intermediate member 50 and the armrests 58, 60. The above-described embodiment allows the operator's seat to swivel in a relatively small operator's compartment. However, where it is desirable to allow the armrests 58, 60 to swivel with the operator's support 48, then the armrests 58, 60 can be secured to the carriage mount 88.

Moreover, the swivel structure 87 may be constructed so as to have a range of motion that is limited in either direction, e.g., a swivel range of up to 25 or more degrees in either direction, from the predetermined position. For example, assume that the operator's seat 32 has been rotated to, and locked in the 90 degrees (side facing) position of FIG. 9 and that the swivel structure 87 allows the operator support 48 to swivel 20 degrees in either direction with respect to the base structure 46. The 20 degrees (or any other suitable swivel range) may be accomplished for example, by selecting a suitable size for the slot 97 through which the second pin 95 traverses. The operator can thus position the operator's seat 32 anywhere in the range of 70 degrees to 110 degrees relative to the 0 degrees (forward facing) position by first locking the operator's seat into the 90 degrees position, then swiveling the operator support 48 with respect to the base structure 46 up to 20 degrees in either direction.

With reference to FIGS. 2 and 4A generally, the seat release system 76 and the swivel structure 87 have different axes of rotation. The first axis 78, defining the rotation axis for the operator's seat 32 with respect to the platform floor 31, is positioned generally forward under the seat bottom 52 when the seat bottom 52 is in the seat down position as shown in FIG. 2. As such, the first axis 78 is spaced radially away from the center of gravity anticipated by a typical operator sitting in the operator's seat. However, as noted above, the seat release system 76 is lockable into designated positions. As such, inertial forces that may tend to rotate the operator's seat 32 during operation of the vehicle 10 are mitigated. Nonetheless, it may be desirable to constrain when the operator's seat 32 may be rotated via the seat release system 76, examples of which are described in greater detail below. The second axis 92, defining a swivel axis for the operator support 48 with respect to the base structure 46, extends generally in-line or proximate to the center of gravity anticipated by the typical operator sitting in the operator's seat 32 and is thus, not coaxial with respect to the first axis 78. As such, inertial effects caused by operating the vehicle 10 will have relatively minimal impact on the swivel structure 87. Thus, the swivel structure 87 may be provided without locks or other restraining devices, and may be unconstrained in terms of when the operator support 48 may be swiveled relative to the base structure 46, as will be described in greater detail herein.

Figure 5:
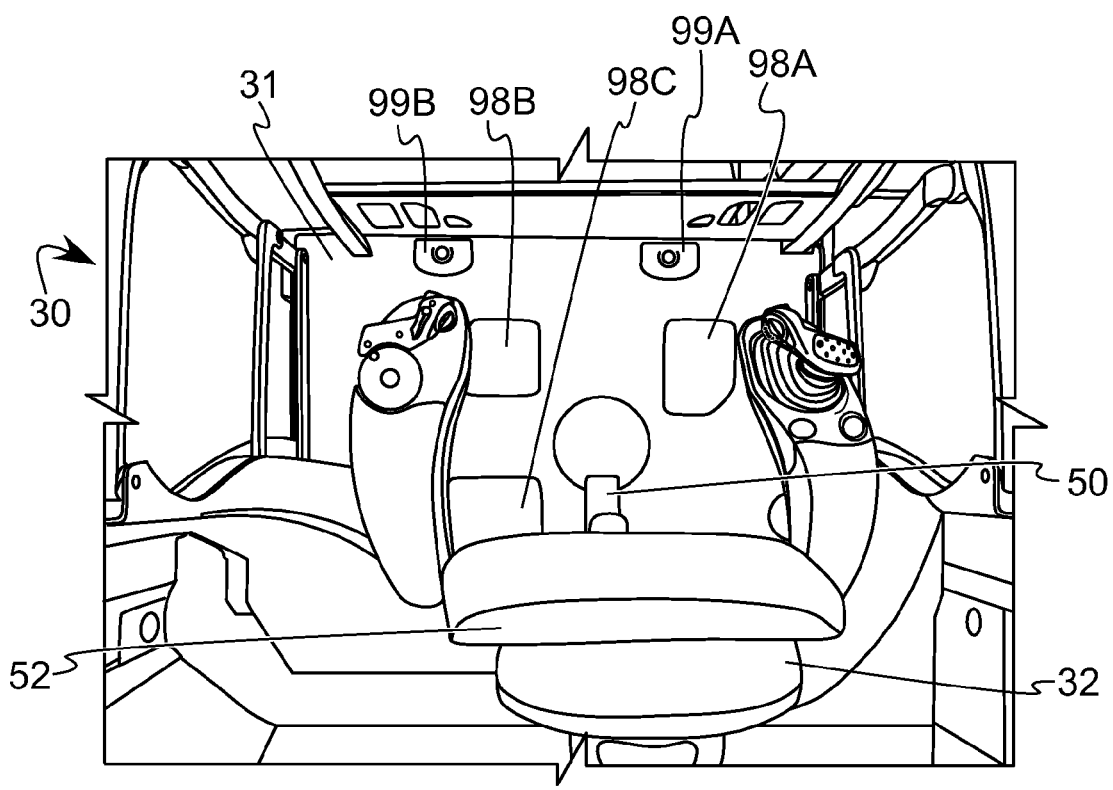
FIG. 5 is a top view of an operator's compartment with the seat bottom of the operator's seat folded up to illustrate an exemplary positioning of presence sensing devices implemented as foot presence switches according to an additional aspect of the present invention.

Referring to FIG. 5, the operator's compartment 30 further includes presence sensing devices 98. Three presence sensing devices are shown, and are thus designated 98A-C. The presence sensing devices 98A-C each define presence sensing switches positioned in the platform floor 31 for detecting the presence of the operator's feet. The presence sensing devices 98A-C are preferably placed at fixed locations in the platform floor 31 about the operator's seat 32. The platform floor 31 may also include one or more pedals 99. For example, the pedals 99A, 99B may include brake pedals, which can be operated in conjunction with the control elements 34 on the armrests 58, 60 of the operator's seat 32 to maneuver the vehicle 10.

As noted above, the operator's seat 32 may be rotated. Thus, all of the presence sensing switches 98 need not detect the presence of a vehicle operator at any given time. Rather, select presence sensing switches 98 may be monitored depending upon the rotated position of the operator's seat. Moreover, the function of select ones of the presence sensing switches 98 may change depending upon the rotated position of the operator's seat 32. For example, as shown, a first presence sensing device 98A is arranged to detect an operator's first (right as shown) foot when the operator's seat 32 is rotated to a forward facing position. A third presence sensing device 98C is arranged to detect an operator's second (left as shown) foot when the operator's seat 32 is rotated to a side facing position. A second presence sensing device 98B is arranged to detect the operator's second (left as shown) foot when the operator's seat 32 is rotated to the forward facing position, and the operator's first (right as shown) foot when the operator's seat is rotated to the side facing position.

As shown, two presence sensing devices 98A, 98B are positioned such that when the operator's seat 32 is in the first position (see FIG. 6) or the second position (see FIG. 7), the presence sensing devices 98A, 98B fall generally under the operator's right and left feet respectively. The rightmost presence sensing device 98A defines a right foot presence detector. The leftmost presence sensing device 98B and/or 98C defines a left foot detector. By allowing the operator's left foot to be sensed by either presence sensing device 98B or presence sensing device 98C, various operating positions including seated and standing positions can be accommodated, thus providing positional relief to an operator.

The leftmost presence sensing device 98B in the above instance, i.e., when the operator's seat 32 is in one of the first and second positions, serves a second or dual purpose when the operator's seat 32 is rotated to one of the third or fourth positions. When the operator's seat is rotated to the third position (see FIG. 8) or the fourth position (see FIG. 9), the presence sensing device 98A and/or 98B defines a right foot sensor. A third presence sensing device 98C is thus positioned generally where operators would tend to place their left foot. It shall be observed that having a limited number of locking positions (such as four in the above example) enables a minimal number of operator presence sensing devices 98A-C, and allows placement of the switches at fixed locations in the floor of the vehicle around the operator's seat 32. However, any number of operator's seat locking positions and corresponding sensing devices 98 can further be provided.

Also, as best seen in FIGS. 7 and 9, the arrangement of the seat release system 76 in cooperation with the shape of the intermediate member 50 allows the operator's seat 32 to be generally centered within the operator's compartment 30 (FIG. 7) when the operator's seat is in the second position (forward facing position). However, the operator's seat 32 is offset to one side of the operator's compartment 30 (FIG. 9) to improve the operator's view and to expand the operator's compartment 30 to improve operator comfort/environment while operating the vehicle 10 in the third and fourth positions.

Referring briefly to FIGS. 2 and 4A generally, to improve comfort of the operator's seat 32, the seat bottom cushion 86 may include a flexible mesh extending over the frame 85. Further, the cushion 86 includes a forward portion 86A and a rearward portion 86B. The forward portion 86A is sloped downward, e.g., includes a forward and down angled contour, relative to the rearward portion 86B of the seat bottom 52. The contour of the seat bottom portion 86A allows an operator to sit relatively higher in the vehicle 10 thus improving operator visibility, while allowing the operator to maintain contact with the presence sensing devices 98A-C on the platform floor 31. Still further, because of the front, downward slant to the seat bottom portion 86A, the operator can easily engage the appropriate presence sensing devices 98, which allows the switches to be positioned generally flush with the platform floor 31.

If the operator's seat 32 is constructed to have greater than approximately 110 degrees of rotation, a fourth presence sensing device (not shown) may be provided such that the presence sensing devices 98 define a square pattern around the operator's seat 32. In this manner, any presence sensing device 98 can be either a right foot or left foot detecting switch dependent upon the positioning of the operator's seat 32. Still further, any number of additional presence sensing devices 98 may be provided, such as to sense intermediate positions. Under such an arrangement, the presence sensing devices 98 detect the presence of the legs and/or feet of an operator. However, multiple sensors and/or combinations of sensors may be used to detect the presence of the operator in each position of the operator's seat to allow for positional relief of the operator.

Additionally, the presence sensing devices 98 may comprise additional and/or alternative actuation devices or other sensing technology capable of detecting the presence of the vehicle operator. For example, other technologies, such as infrared, through beam, capacitive, weight, strain or ultrasonic sensors can be used in place of (or additionally to) the presence switches 98A-98C. Referring to FIG. 10, one exemplary presence sensing arrangement is illustrated. The operator's seat 32 has been partially removed for clarity of discussion. As shown, a sensor mount 120 supports a pair of presence sensing devices 98 implemented as ultrasonic sensors 122A, 122B. Each ultrasonic sensor 122A, 122B is arranged so as to detect a limited range 124A, 124B, which is calibrated so as to detect the presence of an operator's leg, but will not detect the support structures of the operator's compartment 30. As shown, the first ultrasonic sensor 122A is oriented to detect an operator's right leg within the range 124A. Correspondingly, the second ultrasonic sensor 122B is oriented to detect an operator's left leg within the range 124B.

Because the presence sensing ultrasonic sensors 122A, 122B are mounted to the operator's seat, the legs of the operator are tracked irrespective of the rotated position of the operator's seat. As such, the seat release system 76 may include a brake or other structure that allows the operator's seat to be locked and unlocked in an infinite number of positions. Moreover, the rotation of the operator's seat may comprise a full 360 degrees, or have a limited range of rotation.

Moreover, additional and/or alternative presence sensing sensors may be provided about the platform floor 31. Ultrasonic or other presence sensing sensors may be provided in the operator's compartment in the areas of ingress and egress, or sensors may be mounted so as to detect an operator's legs in the vicinity of the operator's seat. Further, a sensor may be provided between adjacent presence sensing devices 98A-C to detect an object that may bridge the sensor pads. Also, because the presence sensing device 98B is a dual purpose switch, e.g., left foot or right foot sensor, the size and geometry may be suitably adjusted to accommodate the various operator's seat positions.

As noted above, pedals 99, e.g., brake pedals, may be provided in the platform floor 31. For example, one elongate brake pedal, or two separate and spaced brake pedals may be provided. When a brake function is implemented using two separate pedals, one pedal is preferably positioned on each side of the vehicle across the front of the operator's compartment 30. Two brake pedals may allow more comfortable braking operations, especially when the vehicle operator is in the fourth position (side facing position). For example, when in the side facing position, the operator may apply the brake by pressing the left most brake pedal with the operator's right foot. Similarly, if a single, elongate brake is provided, the operator's right foot may depress the left-hand portion of the brake.

The provision of a seat release system 76 and a plurality of presence sensing devices 98, among other vehicle characteristics, allow the vehicle 10 to make informed operational decisions, e.g., to selectively limit, disable or enable travel, speed, specific load handling or other operational features of the vehicle. For example, as noted above, the first axis of the seat release system 76 may not be aligned generally with the anticipated center of gravity of an operator seated in the operator's seat 32. As such, certain features of the vehicle 10, e.g., the vehicle speed and/or maneuverability may be limited if the seat release system 76 is unlocked.

Figure 11:
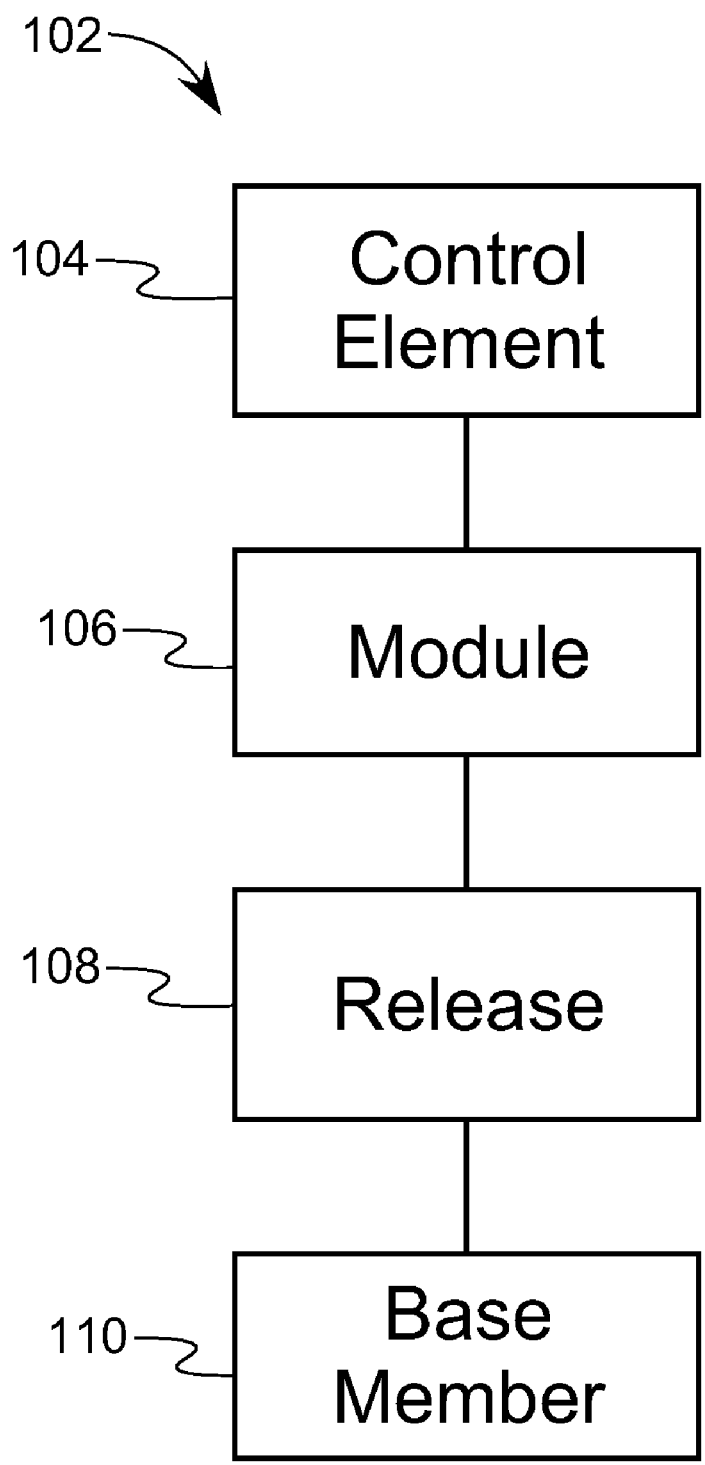
FIG. 11 is a block diagram of an exemplary system for repositioning the operator's seat of FIG. 2.

Referring to FIG. 11, a block diagram illustrates a system 102 for repositioning the operator's seat 32 of the materials handling vehicle 10. The system 102 comprises the control element 104 described above with reference to FIGS. 1-3, but may alternatively comprise any one or more control elements 34 discussed herein including for example, a button, lever or switch. The control element 104 is coupled to a module 106 that includes the necessary logic, including hardware and/or software, to operate a release 108 based upon the input from the control element 104.

The release 108 interacts with a base member 110 of the operator's seat 32 so as to lock and unlock the base structure 46 of the operator's seat 32 for rotational movement with respect to the platform floor 31. Exemplary implementations of the release 108 and base member 110 are shown in FIGS. 2 and 10. With brief reference to FIG. 2, the release 108 may correspond to the release assembly 82 and the base member 110 may correspond to the rotate assembly 80. Referring back to FIG. 11, the orientation of the release 108 with respect to the base member 110 may define at least two states. A first state defines a locked state wherein the base member 110 is restricted from significant rotational movement with respect to the release 108. A second state defines an unlocked state wherein the base member 110 is rotatable with respect to the release 108. For example, when the release 108 is in an unlocked state relative to the base member 110, the base member 110 may be rotated between two or more desired positions.

Activating the control element 104, e.g., depressing a button on the control handle as illustrated in FIG. 3, may instruct the module 106 to transition the release 108 from the first (locked) state to the second (released) state for as long as the control element 104 is held activated. While in the released state, designated by the maintained actuation of the control element 104, the operator is free to rotate the operator's seat 32 to any of the possible positions. Upon releasing the control element 104, the module 106 communicates with the release 108 to enable transition to the first state (locked) wherein the base member 110 is locked into place by the release 108. If discrete designated locking positions are provided, releasing the control element 104 may not lock the operator's seat 32 until the operator further rotates the operator's seat 32 to a select one of the designated locking positions.

Figure 12:
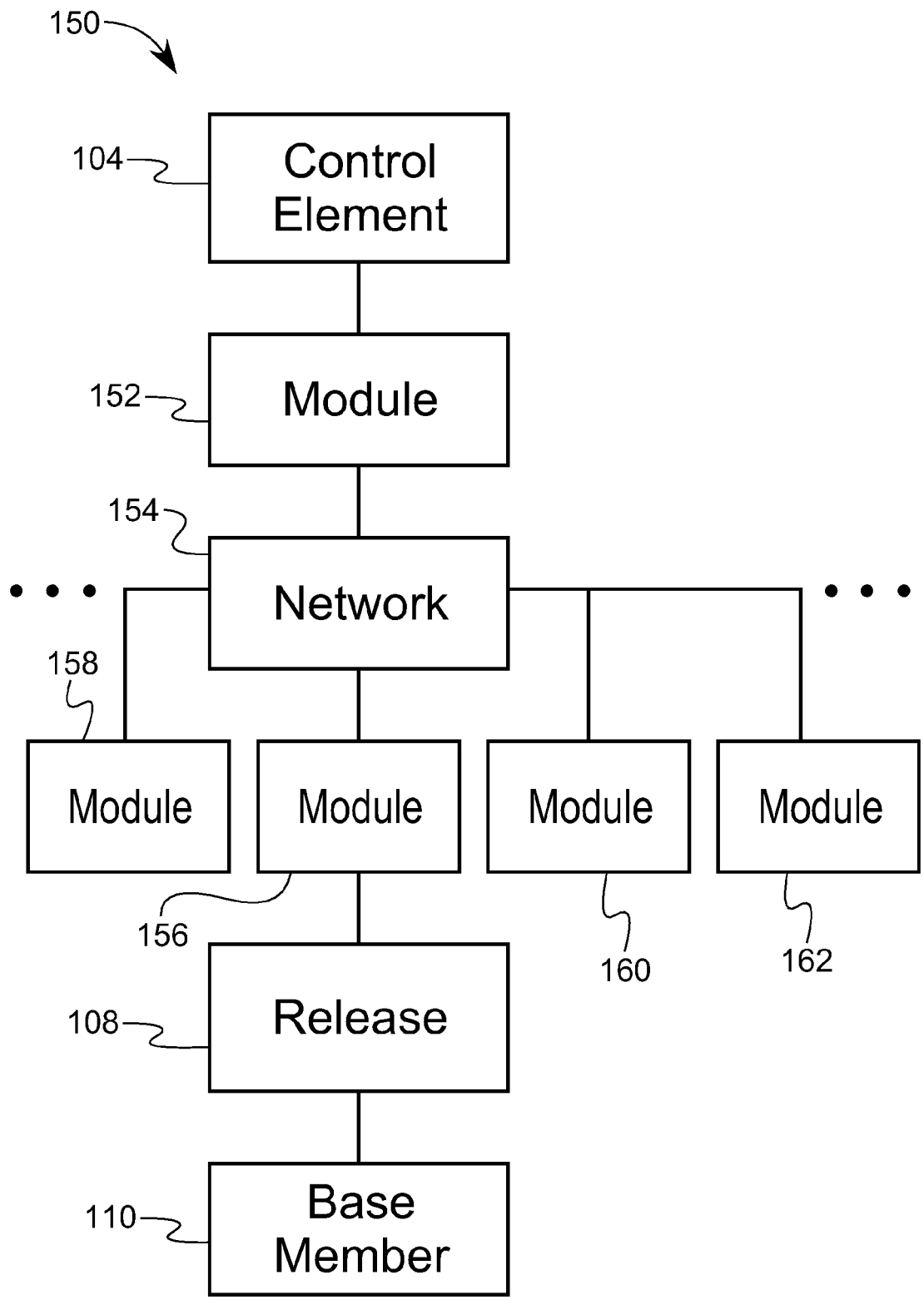
FIG. 12 is a block diagram of another exemplary system for repositioning the operator's seat of FIG. 2.

Referring to FIG. 12, a block diagram illustrates a control system 150, which includes logic for repositioning the operator's seat 32 of the materials handling vehicle 10. The system 150 includes the general functionality of the system 102 discussed with reference to FIG. 10, and further includes the components necessary to implement the system 102 over a network environment. As such, like components are illustrated with like reference numerals.

As illustrated, the control element 104 is coupled to a first module 152. The first module 152 includes the necessary logic, including hardware and/or software, to communicate with the control element 104. When the first module 152 detects that the control element 104 has been actuated, a message is communicated over a network 154, and is received by a second module 156. For example, a Controller Area Network (CAN) may be used to form the network communications link between the first module 152 and the second module 156. The CAN protocol is a convenient network platform for materials handling vehicles as there is no addressing of subscribers or stations in the conventional network sense. Rather, the CAN defines a prioritized system of transmitted messages where the priority of a given message broadcast across the CAN is dependent upon an identifier code. That is, the first module 152 broadcasts a message that includes an identifier, and the message to be communicated. The second module 156 includes the necessary logic, including hardware and/or software, to operate the release 108 based upon the message(s) received from the first module 152 and/or other modules connected to the network 154.

Referring back to FIG. 2, the first module 152 may comprise a logic device that is positioned in the corresponding armrest 58, 60 of the operator's seat 32. Thus the first module 152 may handle communication between the network 154 and all of the control elements 34 including any joysticks, levers, switches, toggles or other control elements in the corresponding armrest 58, 60. Correspondingly, the second module 156 may be positioned proximate to the seat release system 76.

The second module 156 may comprise a vehicle control module (VCM), which is further responsible for performing other functions related to the operation of the vehicle 10. For example, each of the presence sensing devices 98A-C, 122A, 122B may be communicably coupled to the VCM. The VCM receives the seat release command that has been broadcast across the network 154 and then determines whether to ignore the command, or to release the operator's seat 32. As noted above, the VCM may selectively determine whether to release the operator's seat 32 based upon messages from other modules on the network 154. Such messages may address environmental conditions, e.g., vehicle speed, position of the masts 26, 38, the forks 36 or any other condition that can be communicated to the VCM. Additionally, the VCM (or other modules on the network 154) may elect to disable working implements, e.g., the load handling features of the vehicle, while the operator's seat 32 is released. For example, the VCM, or another module in communication with the VCM, may limit the traction speed if the seat rotation is unlocked, and/or disable the hydraulics including the forks 36, or other load handling features if the operator's seat 32 is not in a locked position.

Each message from the first module 152 may compete for bus access with messages generated by other modules on the CAN, and priority will be determined based upon the identifier code. However, once broadcast, a message from the first module 152 can be received by all nodes or modules connected to the CAN network. Thus, a message broadcast by the first module 152 is received by the second module 156 as well as other modules, e.g., modules 158, 160, 162, etc., that are connected to the CAN. Each module 152, 156, 158, 160, 162 may be programmed to decide, e.g., based upon the identifier or other information encoded in the received message, whether that module should take action based upon the received messages. The network 154 may alternatively comprise any other bus system or communications link. As such, the first module 154 may broadcast, unicast or otherwise communicate with the second module 156.

As noted above, the network 154 allows an efficient means for adding intelligent vehicle wide decision making to the vehicle operation. For example, traction speed, certain load handling features or other vehicle operational features can be disabled or limited under certain conditions, e.g., while an operator is repositioning the operator's seat 32. These decision-making operations may be implemented in a rather elegant manner, especially where modules on the network 154 also control the load handling and other features.

As a first example, assume that the module 158 controls operation of the forks 36 on the vehicle 10. Further, assume that commands from the control elements 34 that operate the pivoting and/or traversing of the forks 36 are transmitted across the network 154 and are received by the module 158. The module 158 can be programmed or otherwise configured to ignore commands to perform selected operations with the forks 36 if the presence sensing devices 98A-C indicate that the operator does not have both feet in their appropriate positions based upon the position of the operator's seat 32. As another example, the vehicle 10 may be configured so as to limit or disable predetermined functions of the vehicle 10 if the operator's seat is locked into the third or fourth positions (60 degrees and 90 degrees) unless the operator is seated in the operator's seat, both of the operator's feet are on appropriate ones of the presence sensing devices 98A-98C and both hands activate hand presence sensors 71.

Similarly, the additional modules 160, 162, etc., can transmit additional information to the second module 156 over the network 154, and that additional information may be used to determine whether a request from the first module 152 to release the operator's seat 32 is even permissible. Depending upon the implementation of the vehicle, and the performance requirements thereof, it may be desirable to limit operation of the seat release system 76 to conditions such as when the vehicle is stationary, or traveling at a speed that is below a predetermined threshold, e.g., 2.5 miles per hour (approximately 4 kilometers per hour).

As a second example, assume that the module 160 is coupled to a vehicle speed sensor. If the speed of the vehicle 10 exceeds a predetermined threshold, the module 160 can broadcast an appropriate message across the network 154. If the second module 156 receives a message that indicates that the vehicle is traveling in excess of the predetermined speed threshold, and then subsequently receives a request to unlock the operator's seat 32 from the first module 152, the second module 156 may choose to ignore the request from the first module 152. Alternatively, the first module 152 may elect not to transmit a request to unlock the operator's seat 32 if the vehicle speed exceeds the speed threshold. As noted in greater detail above however, even if the operator's seat cannot be unlocked for rotation, the operator may still be able to swivel the operator support 48 relative to the base structure 46.

Because the message broadcast by the module 160, e.g., vehicle traction speed, is communicated to all nodes on the network 154, the first module 152 will also receive the message from the module 160. As such, the first module 152 may be set up to refuse to transmit a seat release message to the VCM if the first module 152 knows that vehicle 10 is traveling too fast. For example, if the vehicle 10 were to be traveling at or near full speed, then full braking capabilities must be reserved in case a sudden stop is required. If the operator's seat 32 were in an unlocked position and the full braking capabilities of the vehicle were exercised, then the operator's seat may undesirably rotate.

Figure 13:
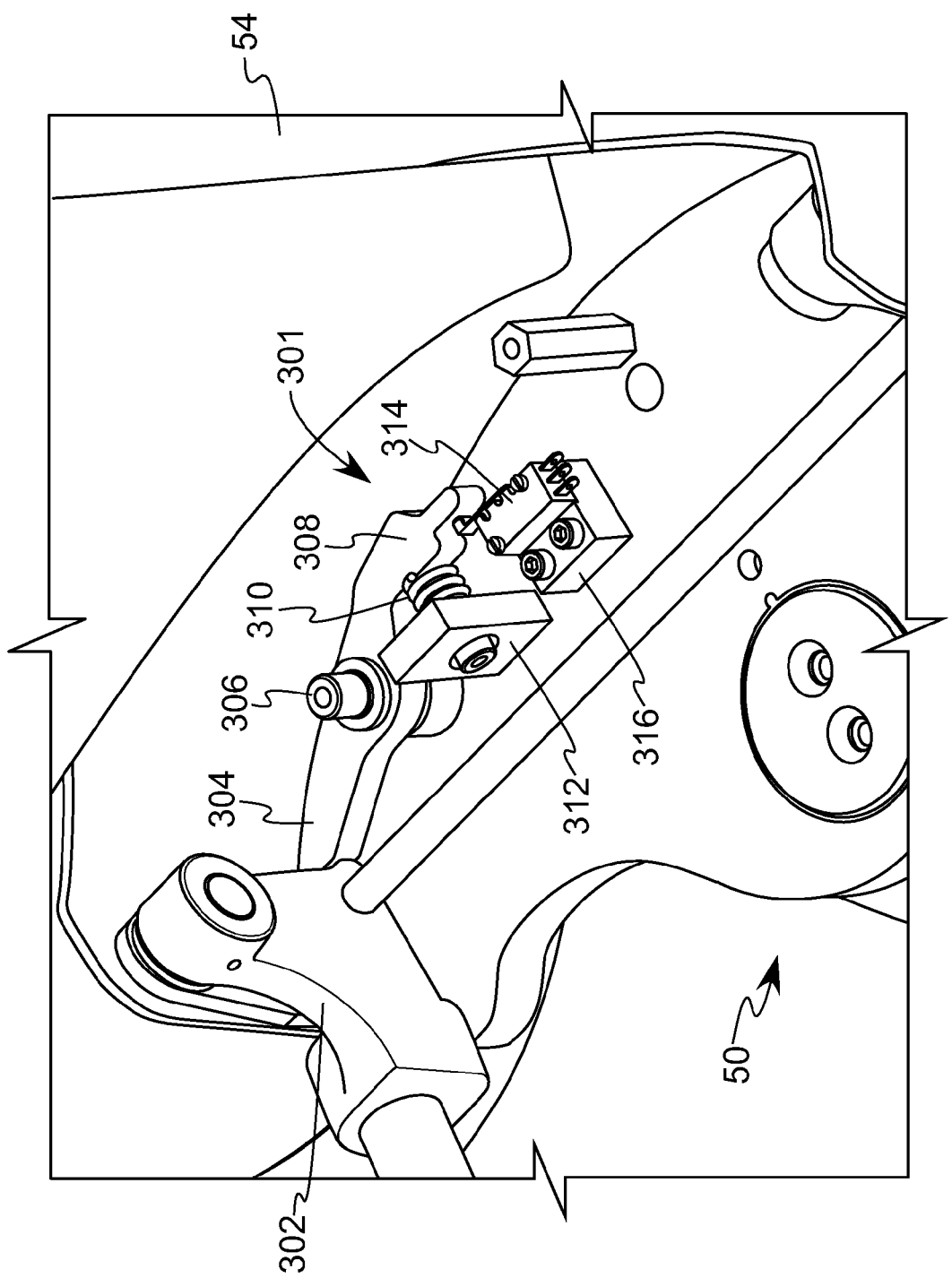
FIG. 13 is a perspective view of a sensor for detecting the presence of an operator sitting in the operator's seat of FIG. 2.

Referring to FIG. 13, the seat bottom 52 may include a sensor 301 to detect whether an operator is actually sitting in the operator's seat 32. The seat bottom 52 includes a seat bottom frame member 302 that pivots with the seat bottom 52 such that when the seat bottom 52 is in the down position and an operator is seated, the seat bottom frame member 302 engages a lever 304. The lever 304 is rotatable about a pivot pin 306 in response to engagement by the seat bottom frame member 302. The lever 304 comprises a head portion 308, which is biased by a biasing member, e.g., by a spring 310 and spring support structure 312. The head portion 308 is further positioned proximate to a detector, e.g., a contact switch 314. The contact switch 314 may optionally be positioned on a block 316 or other, optionally adjustable support structure.

When the seat bottom 52 is in a down position, the weight of the seat bottom 52 alone will not be sufficient to operate the contact switch 314. However, when an operator is seated, the seat bottom frame member 302 pushes against the lever 304 causing the lever 304 to rotate about the pivot pin 306 in a clockwise manner as shown. The clockwise rotation of the lever 304 causes the biasing member 310 to compress, which allows the head portion 308 of the lever 304 to operate the contact switch 314 indicating that an operator is seated. If there is no operator sitting in the seat bottom 52, or when the seat bottom 52 is in the up position shown in FIG. 4, the biasing member 310 rotates the lever 304 counterclockwise so that the head portion 308 of the lever 304 allows the contact switch 314 to release thus designating that the operator is not sitting. The status of the contact switch 314 may be communicated to a module, e.g., the module 152 shown in FIG. 2, and be broadcast to the second module 156, e.g., the VCM module, or alternatively, the third switch 314 may be hardwired directly to the VCM, i.e., the second module 156, or to any other module 152, 158, 160, 162, etc. Other arrangements may be used in addition to, or in lieu of the above described sensor to detect whether the operator is seated, including for example, capacitive sensors and strain sensors.

There are circumstances where an operator may prefer to operate the vehicle in a standing position. However, when the operator is standing, certain vehicle operations, e.g., vehicle speed, may be disabled or reduced in functionality. For example, assume that the operator's seat is in the second (forward facing) position. If the system detects that the seat bottom is raised (e.g., as shown in FIG. 4A), i.e., the operator is standing, the control of the load handling features of the vehicle may be disabled or limited in functionality unless the hand sensors 71, the presence sensing devices 98A and one of the presence sensing devices 98B or 98C (or the presence sensing devices 122A, 122B) detect the presence of the operator's feet/legs. Again, since all messages are broadcast to all modules in a CAN network, each module 152, 156, 158, 160, 162, etc., may make decisions or perform functions based upon inputs from any one or more of the remaining modules 152, 156, 158, 160, 162, etc., on the network 154.

The above examples were presented by way of illustration and not by way of limitation to demonstrate the broad flexibility of the present invention. Moreover, the present invention is not limited to a prescribed number of modules, or to a prescribed functionality of any given module. For example, there can be more modules than disclosed herein, and alternative communications protocols may be implemented.

Having described the invention in detail and by reference to preferred embodiments thereof, it will be apparent that modifications and variations are possible without departing from the scope of the invention defined in the appended claims.

What is claimed is:

1. An operator's compartment for a vehicle comprising:
a platform floor;
an operator's seat including:
 a base structure coupled to said platform floor; and
 an operator support coupled to said base structure such that said operator support may be rotated with respect to said platform floor;
at least one presence sensing device arranged to sense an operator's presence in a predetermined location;
an armrest;
a control element on a control handle of said armrest for selectively releasing said operator's seat for rotation with respect to said platform floor, wherein said control handle provides at least one other vehicle control function; and
a control module configured to control at least one operation of said vehicle based upon a rotational position of said operator's seat and a signal from at least one presence sensing device.

2. The operator's compartment according to claim 1, wherein at least one presence sensing device comprises a floor mounted switch and said operator support further comprises a seat bottom having a forward portion that is sloped downward relative to a rearward portion of said seat bottom sufficiently so that said operator may maintain foot contact with said floor mounted switch while seated at a relatively higher position than what could be achieved compared to a substantially flat seat bottom.

3. The operator's compartment according to claim 1, wherein said operator support comprises a seat bottom and a seat bottom sensor, said seat bottom sensor operatively configured to detect whether said operator is seated on said seat bottom.

4. The operator's compartment according to claim 3, wherein at least one operation of said vehicle is affected by the status of said seat bottom sensor.

5. The operator's compartment according to claim 1, wherein said operator's seat further comprises:
a swivel structure arranged to allow said operator support to swivel relative to said base structure.

6. The operator's compartment according to claim 5, wherein said base structure defines an axis of rotation that is not coaxial with respect to a swivel axis of said swivel structure.

7. The operator's compartment according to claim 1, wherein a select one presence sensing device is configured to detect the presence of an operator's left foot when said operator's seat is in a first position and detect said operator's right foot when said operator's seat is rotated to a second position;
said control module is configured to control a first function of said vehicle based upon a signal from said select one presence sensing device indicating detection of said operator's left foot when said operator's seat is in said first rotated position; and
said control module is configured to control a second function of said vehicle based upon a signal from said select one presence sensing device indicating detection of said operator's right foot when said operator's seat is in said second rotated position.

8. The operator's compartment according to claim 1, wherein at least one presence sensing device comprises a floor mounted switch.

9. An operator's compartment for a vehicle comprising:
a platform floor;
an operator's seat including:
a base structure coupled to said platform floor; and
an operator support coupled to said base structure such that said operator support may be rotated with respect to said platform floor;
at least three presence sensing devices, each mounted generally flush with said platform floor, each said presence sensing device further arranged to sense an operator's presence in a predetermined location; and
a control module configured to control at least one operation of said vehicle based upon a rotational position of said operator's seat and a signal from at least one said presence sensing device.

10. The operator's compartment according to claim 9, wherein at least one presence sensing device is positioned on said platform floor so as to detect a select one of an operator's right foot or an operator's left foot depending upon a rotated position of said operator's seat.

11. The operator's compartment according to claim 9, wherein said operator's seat may be rotated between a forward facing position and a side facing position, said operator's seat further configured such that said operator's seat is generally centered in said operator's compartment when in said forward facing position, and said operator's seat is offset to one side of said operator's compartment when said operator's seat is in said side facing position.

12. The operator's compartment according to claim 9, wherein said first presence sensing device is arranged to detect an operators first foot or leg when said operator's seat is in a forward facing position, said third presence sensing device is arranged to detect an operators second foot or leg when said operator's seat is in a side facing position, and said second presence sensing device is arranged to detect said operator's second foot or leg when said operator's seat is in said forward facing position, and said operators first foot or leg when said operator's seat is in said side facing position.

13. An operator's compartment for a vehicle comprising:
a platform floor;
an operator's seat including:
a base structure coupled to said platform floor; and
an operator support coupled to said base structure such that said operator support may be rotated with respect to said platform floor;
at least one ultrasonic sensor mounted so as to detect the presence of an operator's leg in a predetermined location; and
a control module configured to control at least one operation of said vehicle based upon a rotational position of said operator's seat and a signal from at least one said ultrasonic sensor.

14. The operator's compartment according to claim 13, wherein said at least one ultrasonic sensor is mounted to said operator's seat and is arranged so as to rotate as said operator's support is rotated relative to said platform floor.

15. An operator's compartment for a vehicle comprising:
a platform floor;
an operator's seat including:
a base structure coupled to said platform floor;
an operator support coupled to said base structure such that said operator support may be rotated with respect to said platform floor, said operator support having a seat bottom;
a seat bottom sensor operatively configured to detect whether said operator is seated on said seat bottom;
an armrest; and
a control element on a control handle of said armrest for selectively releasing said operator's seat for rotation with respect to said platform floor, wherein said control handle provides at least one other vehicle control function;
at least one presence sensing device arranged to sense an operator's presence in a predetermined location; and
a control module configured to control at least one operation of said vehicle based upon the combination of said seat bottom sensor and at least one presence sensing device.

16. The operator's compartment according to claim 15, wherein said control module is configured to control at least one operation of said vehicle further based upon a rotational position of said operator's seat.

17. An operator's compartment for a vehicle comprising:
a platform floor;
an operator's seat including:
a base structure coupled to said platform floor;
an operator support coupled to said base structure such that said operator support may be rotated with respect to said platform floor, said operator support having a seat bottom;

an armrest; and a control element on a control handle of said armrest for selectively releasing said operator's seat for rotation with respect to said platform floor, wherein said control handle provides at least one other vehicle control function;

at least one presence sensing device configured to detect the presence of an operator's left foot when said operator's seat is in a first rotated position and said operator's right foot when said operator's seat is in a second rotated position; and a control module configured to control at least one operation of said vehicle based upon a rotational position of said operator's seat and a signal from at least one presence sensing device.

18. The operator's compartment according to claim 17, wherein said at least one presence sensing device comprises first, second and third presence sensing devices, wherein said first presence sensing device is arranged to detect an operators first foot or leg when said operator's seat is in a forward facing position, said third presence sensing device is arranged to detect an operators second foot or leg when said operator's seat is in a side facing position, and said second presence sensing device is arranged to detect said operator's second foot or leg when said operator's seat is in said forward facing position, and said operators first foot or leg when said operator's seat is in said side facing position.

* * * * *

UNITED STATES PATENT AND TRADEMARK OFFICE
CERTIFICATE OF CORRECTION

PATENT NO. : 7,347,299 B2
APPLICATION NO. : 11/539676
DATED : March 25, 2008
INVENTOR(S) : Steven C. Billger et al.

It is certified that error appears in the above-identified patent and that said Letters Patent is hereby corrected as shown below:

Col. 16, line 6, "an operators first foot" should read --an operator's first foot--;

Col. 16, line 8, "an operators second foot" should read --an operator's second foot--;

Col. 16, line 12, "and said operators first foot" should read --and said operator's first foot--;

Col. 18, line 5, "operators first foot" should read --operator's first foot--;

Col. 18, line 7, "an operators second foot" should read --an operator's second foot--;

Signed and Sealed this

Nineteenth Day of August, 2008

JON W. DUDAS
*Director of the United States Patent and Trademark Office*